United States Patent
Loginov et al.

(10) Patent No.: US 11,010,776 B1
(45) Date of Patent: May 18, 2021

(54) SYSTEM AND METHOD FOR DETERMINING VALUE OF DIGITAL CONTENT

(71) Applicant: Egnyte, Inc., Mountain View, CA (US)

(72) Inventors: Nikita Loginov, Mountain View, CA (US); Isabelle Stephanie Guis, Menlo Park, CA (US); Narayanan Achalu, Cupertino, CA (US); Amrit Jassal, Morgan Hill, CA (US)

(73) Assignee: Egnyte, Inc., Mountain View, CA (US)

( * ) Notice: Subject to any disclaimer, the term of this patent is extended or adjusted under 35 U.S.C. 154(b) by 463 days.

(21) Appl. No.: 15/937,379

(22) Filed: Mar. 27, 2018

Related U.S. Application Data

(60) Provisional application No. 62/477,279, filed on Mar. 27, 2017.

(51) Int. Cl.
| | |
|---|---|
| *G06Q 10/00* | (2012.01) |
| *G06Q 50/00* | (2012.01) |
| *G06F 16/00* | (2019.01) |
| *G06Q 30/02* | (2012.01) |
| *G06Q 50/18* | (2012.01) |
| *G06F 16/14* | (2019.01) |
| *G06F 16/17* | (2019.01) |
| *G06F 16/11* | (2019.01) |
| *G06F 16/28* | (2019.01) |

(52) U.S. Cl.
CPC ....... *G06Q 30/0206* (2013.01); *G06F 16/122* (2019.01); *G06F 16/14* (2019.01); *G06F 16/17* (2019.01); *G06F 16/284* (2019.01); *G06Q 50/184* (2013.01)

(58) Field of Classification Search
CPC ..................................................... G06F 16/00
USPC ............................................. 705/7.11–7.42
See application file for complete search history.

(56) References Cited

U.S. PATENT DOCUMENTS

| | | | | |
|---|---|---|---|---|
| 2004/0002972 | A1* | 1/2004 | Pather | G06F 9/542 |
| 2006/0161788 | A1* | 7/2006 | Turpin | G06K 9/4652 |
| | | | | 713/186 |
| 2013/0262418 | A1* | 10/2013 | Bhasin | G06F 16/10 |
| | | | | 707/694 |
| 2015/0324609 | A1* | 11/2015 | Grubel | H04L 63/105 |
| | | | | 726/26 |

* cited by examiner

*Primary Examiner* — Alan S Miller
*Assistant Examiner* — Mustafa Iqbal
(74) *Attorney, Agent, or Firm* — Larry E. Henneman, Jr.; Henneman & Associates, PLC

(57) ABSTRACT

A novel system for performing valuations of file system objects include a processor configured to execute code and memory configured to store data and the code. The code includes an accumulator configured to accumulate secondary data associated with said file system objects, a data aggregator configured to arrange the secondary data in the memory, and a value generator configured to generate an object value indicative of the value of at least one of the file system objects to a particular entity. In a particular embodiment, the value generator creates a record in a valuation database to associate the object value with the at least one of the file system objects.

37 Claims, 13 Drawing Sheets

SYSTEM AND METHOD FOR DETERMINING VALUE OF DIGITAL CONTENT

RELATED APPLICATIONS

This application claims the benefit of U.S. Provisional Patent Application No. 62/477,279, filed on Mar. 27, 2017 by at least one common inventor, which is incorporated herein by reference in its entirety.

BACKGROUND OF THE INVENTION

Field of the Invention

This invention relates generally to digital content management, and more particularly to systems and methods of categorizing and determining the value of digital content.

Description of the Background Art

The storage and management of digital content (e.g., files, folders, etc.) has become commonplace in most organizations today. Knowledge of content value is relevant to multiple IT and business applications, such as defining security policies to protect valuable files, always having a back-up copy of the business's critical information, and identifying and evaluating security "red flags". Currently, the problem that exists in the content management and analytics space is how to estimate that content value, and do so accurately, in order to drive optimal IT and business decisions.

There have been attempts to automate the process of estimating file value by means of computer algorithms. Such algorithms scan file content and try to identify important patterns, such as personally identifiable information (credit card numbers, social security numbers) or compliance information (e.g. HIPAA). While this approach works reasonably well for data security applications, it has a few drawbacks when it comes to other types of content value. This is because such an approach cannot estimate the importance of a file to the organization itself in terms of various aspects. At the same time, not all valuable files contain patterns that are identifiable without human involvement, and content scanning does not work for all files. Another problem is that even if content classification works, it cannot always identify fake sensitive content from real, and thus may have a high false positive rate.

What is needed, therefore, is a system and method for more accurately determining the value of digital content.

SUMMARY

The inventors have recognized that not all digital content in an organization has the same value and that it is advantageous to quantify the business value of digital content (e.g., files). For example, a particular file (e.g. intellectual property file) may have a much higher security value than a file containing a product catalog. Furthermore, the value(s) of digital content is not necessarily limited to a single category. In other words, the same content can have different values in the context of different paradigms (e.g., security perspective, operational perspective, intellectual property perspective, and so on). For example, a file may have a low business value from a security perspective, but a high business value from an operational perspective due to how frequently it is accessed by members of the organization. As another example, a file containing personally identifiable information is valuable from the perspective of data security and privacy, but probably not so valuable from an operational perspective. As yet another example, a digital ad for a viral marketing campaign may not be highly valuable from the data security perspective, but may be relatively more valuable from the perspective of instant content access and sharing at scale.

Various embodiments of the present invention overcome problems associate with the prior art by providing systems and methods of determining values of differing types for file system objects. The systems and methods can be implemented in a local file system or in a distributed cloud file system via a wide-area network.

An example method for performing valuations of file system objects in a file storage system includes accumulating secondary data associated with the file system objects and arranging the secondary data in a storage device. The secondary data is other than content of the file system objects (i.e., not file system object content). The example method additionally includes generating an object value indicative of the value of at least one of the file system objects to a particular entity, and creating a record in a valuation database. The record associates the object value with the at least one of the file system objects.

In a particular example method, the step of generating an object value includes generating a plurality of object values. Each object value is indicative of a distinct value of the at least one of the file system objects from a different perspective. For example, one of the plurality of object values can be indicative of a value of the at least one of the file system objects from a data security perspective. As another example, one (or another) of the plurality of object values can be indicative of a value of the at least one of the file system objects from a business continuity perspective. As yet another example, the object value can be expressed in the form of a particular monetary currency (e.g., a dollar value).

In a particular example method, the secondary data includes data associated with the particular entity but not directly associated with any particular subset of the file system objects. The step of generating an object value includes generating compound data based at least in part on the secondary data accumulated from different sources, and using the compound data to generate the object value. Optionally, the compound data can include user activity data associated with the file system objects. The user activity data is indicative of activity of users of the file storage system with respect to the file system objects (e.g., file access/modification data).

A more particular example method includes accumulating primary data indicative of content of the individual ones of the file system objects and arranging the primary data in the storage device. The step of accumulating primary data can include scanning the individual ones of the file system objects to obtain the content from the individual ones of the file system objects. The step of accumulating primary data can also include categorizing the individual ones of the file system objects based at least in part on the content of the individual ones of the file system objects.

The step of accumulating secondary data can include accessing metadata associated with the individual ones of the file system objects. The step of accumulating secondary data can also include accumulating data indicative of an infrastructure of the file storage system. Optionally, the step of accumulating secondary data and/or primary data includes accessing the file system objects of the file storage system over a wide area network.

An example method additionally includes utilizing at least a portion of the primary data and the secondary data to generate compound data. The compound data can be indicative of relationships between individual ones of the file system objects. In the example method, the step of utilizing at least a portion of the primary data and the secondary data to generate compound data can include estimating the similarity of two or more different ones of the file system objects, based at least in part on the primary data.

An example method further includes expressing the object value of the at least one of the file system objects relative to object values of other objects of the file system. The step of expressing the object value of the at least one of the file system objects relative to object values of other objects of the file system can include expressing the object value relative to a base value that is equal to a lowest object value of the object values of the other objects of the file system.

Example methods can additionally include utilizing the object value(s) of the file system object(s) to inform IT policy changes relating to the particular entity.

Example valuation systems for performing valuations of file system objects are also disclosed. A particular example valuation system includes a processor configured to execute code and memory configured to store data and the code. The code includes an accumulator, a data aggregator, and a value generator. The accumulator is configured to accumulate secondary data associated with the file system objects. The secondary data is non-object-content data (e.g., does not include file object content). The data aggregator is configured to arrange the secondary data in the memory, and the value generator configured to generate an object value indicative of the value of at least one of the file system objects to a particular entity (e.g., an enterprise). The value generator can also create record(s) in a valuation database to associate the object value(s) with the file system object(s).

In an example system, the secondary data includes data associated with the particular entity but not directly associated with any particular subset of the file system objects. The value generator can be configured to generate a plurality of different object values for each particular file system object. Each different object value can be indicative of a distinct value associated with the particular file system object from a different perspective. For example, one of the object values of the plurality of object values can be indicative of a value of the file system object(s) from a data security perspective. Another of the plurality of object values can be indicative of a value of the file system object(s) from a business continuity perspective. Optionally, the object value(s) can be expressed in the form of a particular monetary currency (e.g., a dollar value).

In an example system, the value generator is configured to generate compound data based at least in part on the secondary data accumulated from different sources. The value generator is also configured to utilize the compound data to generate the object value(s).

The compound data can include user activity data associated with the file system objects. The user activity data (e.g., file access records) is indicative of activity of users of the file storage system with respect to the file system objects.

In a particular example system, the accumulator is configured to accumulate primary data (e.g., file content) indicative of content of the individual ones of the file system objects. In addition, the data aggregator is configured to arrange the primary data in the storage device. The accumulator is additionally configured to scan the individual ones of the file system objects to obtain the content from the individual ones of the file system objects. The accumulator can be additionally configured to categorize the individual ones of the file system objects based at least in part on the content of the individual ones of the file system objects. The accumulator can also be configured to access metadata associated with the individual ones of the file system objects and/or accumulate data indicative of an infrastructure of the file storage system. Optionally, the example system additionally includes a network adapter configured to access the file system objects of the file storage system over a wide area network (e.g., objects on a distributed cloud file storage system or other file storage system remote from the valuation system).

The value generator can be configured to utilize at least a portion of the primary data and the secondary data to generate compound data. The compound data can be indicative of relationships between individual ones of the file system objects. For example, the value generator can be additionally configured to estimate the similarity of two or more different ones of the file system objects, based at least in part on the primary data. The value generator can also be configured to express the object value of the at least one of the file system objects relative to object values of others of the file system objects. The value generator can additionally be configured to express the object value relative to a base value that is equal to a lowest object value of the object values of the others of the file system objects.

An example system additionally includes a valuation enforcer configured to utilize the object value(s) of the file system object(s) to inform IT policy changes relating to the particular entity.

Another example valuation system, for performing valuations of file system objects, includes an accumulator configured to accumulate secondary data associated with the file system objects. The secondary data is non-object-content data. The example valuation system additionally includes a data aggregator configured to arrange the secondary data in a storage device. The example valuation system additionally includes means for generating an object value indicative of the value of at least one of the file system objects to a particular entity, and for associating the object value with the at least one of the file system objects.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system and method for determining values and value categories for digital content. In the following description, numerous specific details are set forth in order to provide a thorough understanding of the invention (e.g., examples of value categories). Those skilled in the art will recognize, however, that the invention may be practiced apart from these specific details. In other instances, details of well-known computing practices (e.g., database programming, etc.) and components have been omitted, so as not to unnecessarily obscure the present invention.

Figure 1:
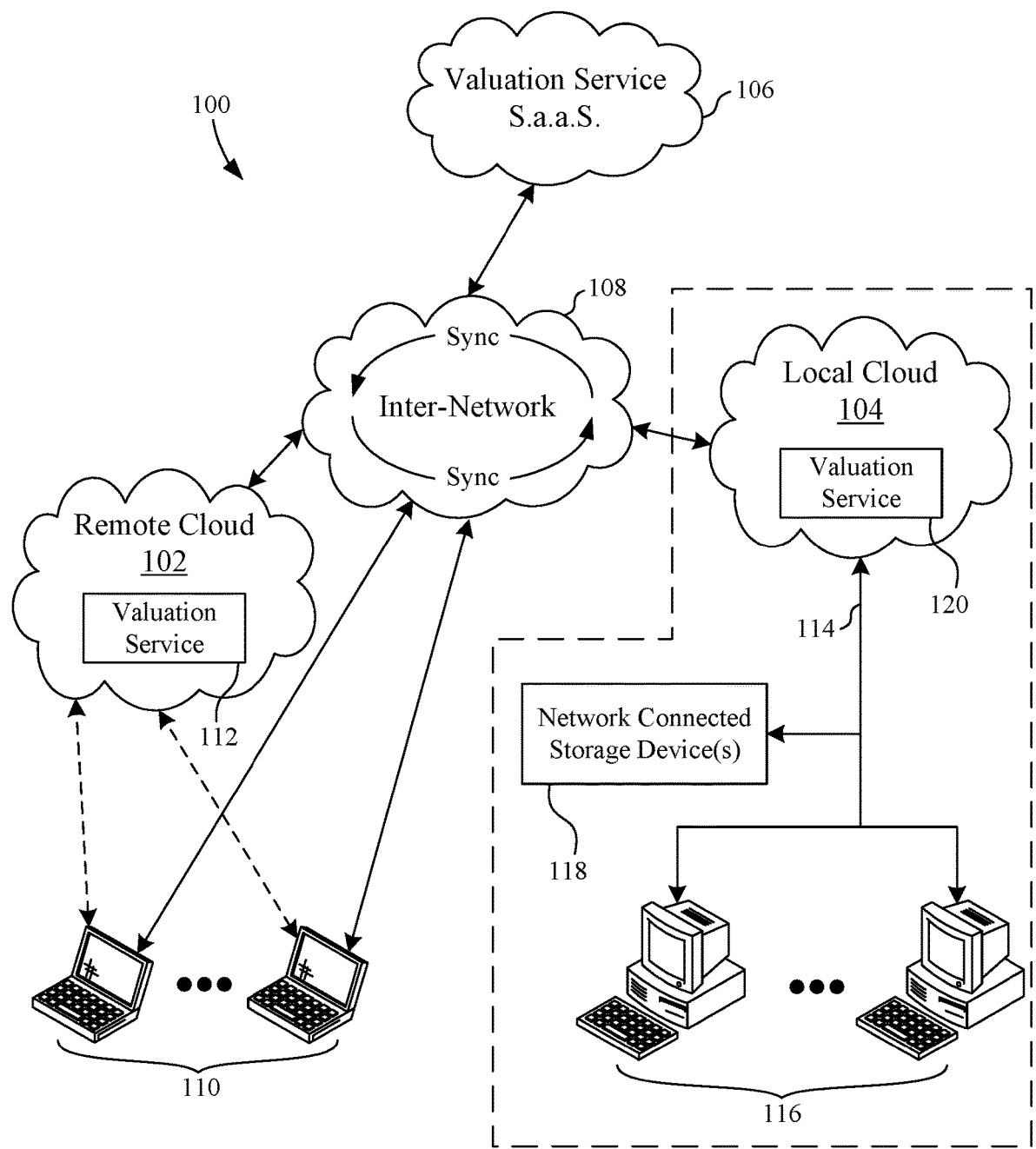
FIG. 1 is a block diagram of a cloud computing system configured for valuing digital content.

FIG. 1 is a block diagram of a cloud computing system 100 configured for valuing digital content. System 100 includes a cloud content storage/computing system (remote cloud) 102, a local cloud system (local cloud) 104, and a valuation service software as a service (SaaS) 106, all intercommunicating via an internetwork 108. Note that internetwork 108 could be any type of communication network (e.g., the Internet, wide-area network, telecom system, etc.).

Remote cloud 102 is a distributed remote file storage system and server accessible to clients 110 over internetwork 108. Remote cloud 102 stores data associated with a particular entity (or a plurality of different entities) (e.g., a business, a cloud customer, etc.) and provides access to the stored data to clients 110, who are associated with the particular entity. Remote cloud 102 includes a valuation service 112 operative on the data stored therein. Valuation service 112 generates and stores valuation data corresponding to digital objects stored on remote cloud 102. The valuation data is indicative of the value of individual data objects, from various perspectives, to the particular entity associated with those object on remote cloud 102.

Local cloud 104 stores data associated with the particular entity and accessible through a local network 114. Local clients 116, having access to local network 114, can access data stored on local cloud 104, including data objects, applications, etc. Additional network connected storage device(s) 118 are connected to local network 114. Network connected storage device(s) 118 provide additional data storage and can be accessed by local clients 116 through local network 114. Local cloud 104 also includes a valuation service 120, which generates and stores valuation data corresponding to digital content stored in local cloud 104, local clients 116, and/or network connected storage device(s) 118. In particular embodiments, the data/objects stored on local cloud 104 and remote cloud 102 are synchronized.

Valuation service SaaS module 106 is a value generation system that is implemented in the form of remote software as a service. SaaS module 108 can be operative on data stored in remote cloud 102, local cloud 104, and/or network connected storage devices 118. SaaS module 106 accesses digital objects (and associated data) stored on remote cloud 102, local cloud 104, and/or network connected storage devices 118 through publicly available application programming interfaces (APIs). More information regarding the access of data by SaaS module 106 (as well as remote cloud 102 and local cloud 104) can be found in U.S. patent application Ser. No. 15/487,947, entitled Hybrid Approach to Data Governance, filed Apr. 14, 2017 by Jassal et al., which is incorporated herein by reference in its entirety.

Valuation services 112, 120 and 106 are generally similar in function, but require slight differences in implementation. For example, valuation service 112 has local access to data objects associated with a plurality of different cloud customers and must, therefore, differentiate between data objects belonging to different customers. Valuation service 120 has local access to data objects associated only with the particular entity associated with local network 114, so has no need to differentiate between data objects associated with different customers, but must be able to access a variety of data sources over local network 114. Additionally, valuation service SaaS module 106 must access data sources over inter-network 108. For these reasons, valuation services 112, 120, and 106 are similar, but not completely interchangeable. For the sake of brevity, the present invention will be described in more detail with reference to valuation service 112, and not valuation service 106 or valuation service 120. However, it will be apparent to those skilled in the art how configure valuation services 120 and 106 in view of the following description and Jassal et al., cited above.

Figure 2:
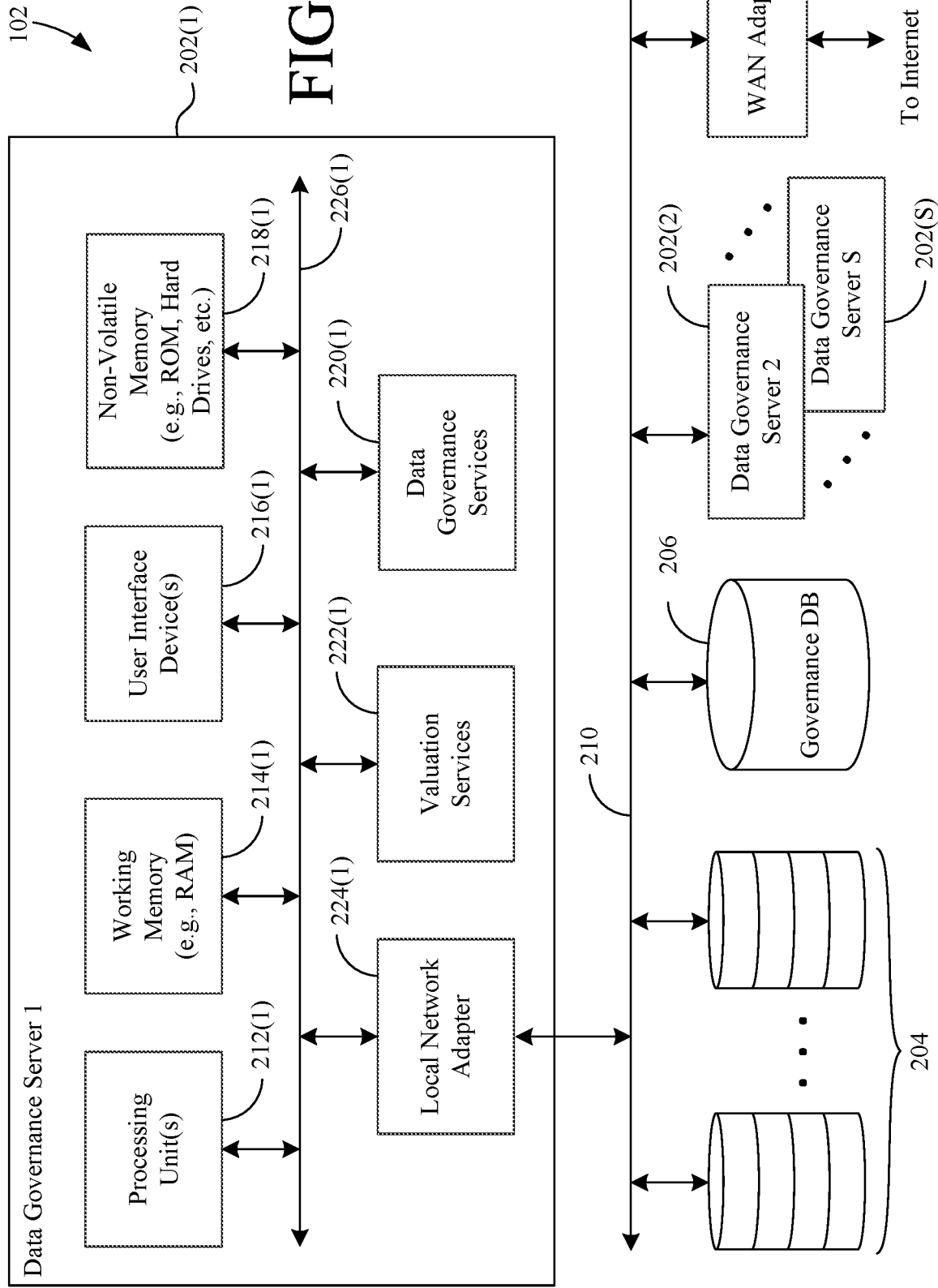
FIG. 2 is a block diagram showing a remote cloud of FIG. 1 in greater detail.

FIG. 2 is a block diagram showing remote cloud 102 in greater detail. Remote cloud 102 includes a plurality of data governance servers 202(1-S), a plurality of multi-tenant storage devices 204, a governance database 206, and a wide-area network (WAN) adapter 208, all interconnected via a local network 210. Multi-tenant storage devices 204 are, for example, RAID-equipped hard drives, which provide non-volatile storage for data belonging to cloud customers associated with remote cloud 102. Governance database 206 is a relational database containing data necessary for data governance servers 202 to provide data governance services (including data valuation services) to the cloud customers. The data contained in governance database 206 will be discussed in more detail below. WAN adapter 208 provides Internet access to the other components of remote cloud 102. Particularly, WAN adapter 208 allows the components of remote cloud 102 to send and receive data objects, software, commands, instructions, etc. from remote systems (e.g. local cloud 104) over the Internet.

Data governance servers 202 provide data governance services, such as data monitoring, data analytics, etc. for data stored on multi-tenant storage devices 204. Particularly, data governance servers 202 provide valuation services for digital objects stored on multi-tenant storage devices 204. Each of data governance servers 202 corresponds to a different cloud customer. Data governance server 202(1), for example, corresponds to a first cloud customer (associated with local cloud 104) and includes a processing unit(s) 212(1), working memory 214(1), a user interface device(s) 216(1), non-volatile memory 218(1), a data governance services module 220(1), a valuation services module 222(1), and a local network adapter 224(1), all interconnected and communicating via an internal bus 226(1). Processing unit(s) 212(1) execute code that is transferred into working memory 214(1) from, for example, non-volatile memory 218(1) and/or client storage devices 204 to impart functionality to governance server 202(1). Working memory 214(1) stores accessed data, including definitions, domain names, etc., as well as the code that is processed by processing unit(s) 212(1) to perform the intended functions of data governance server 202(1). User interface device(s) 216(1) is an access interface that allows IT technicians to access data governance server 202(1) for various reasons, such as software, firmware, and/or hardware updates. Non-volatile memory 218(1) provides additional non-volatile storage for use by governance server 202(1). Data governance services 220(1) are various software services, running within working memory 214(1), for collecting, manipulating, and analyzing data, in order to manage the overall availability, usability, integrity, and security of data belonging to the associated cloud customer. Valuation services 222(1) include various software services, running within working memory 214(1), for collecting, manipulating, and analyzing data, in order to determine the values of data objects (stored in multi-tenant storage devices 204) to the associated cloud customer. Local network adapter 224(1) provides a network connection between data governance server 202(1) and local network 210 and, therefore, WAN adapter 208, which provides a connection to the Internet 108. Although only data governance server 202(1) is shown in detail, it should be understood that data governance server 202(1) is substantially similar to data governance servers 202(2-S), except that any of data governance servers 202 can correspond to different cloud clients and, therefore, can be configured differently to utilize different data, applications, network connections, etc. Optionally, although data governance servers 202(1-S) are shown as separate machines, data governance servers 202(1-S) can be implemented with virtual machines running on one or more servers.

The valuation services implemented on local cloud 104 or valuation service SaaS 106 can utilize hardware differing from data governance servers 202(1-S). For example, the valuation services located at local cloud 104 can be implemented on a personal computer, a network connected storage device, or a network attached server, or can be distributed across a plurality of similar devices. Additionally, some software aspects may differ. For example, the valuation services implemented via valuation service SaaS 106 require functionality for accessing data stored on remote storage devices through the Internet. Such variations will be apparent to those skilled in the art, particularly in view of this disclosure.

Figure 3:
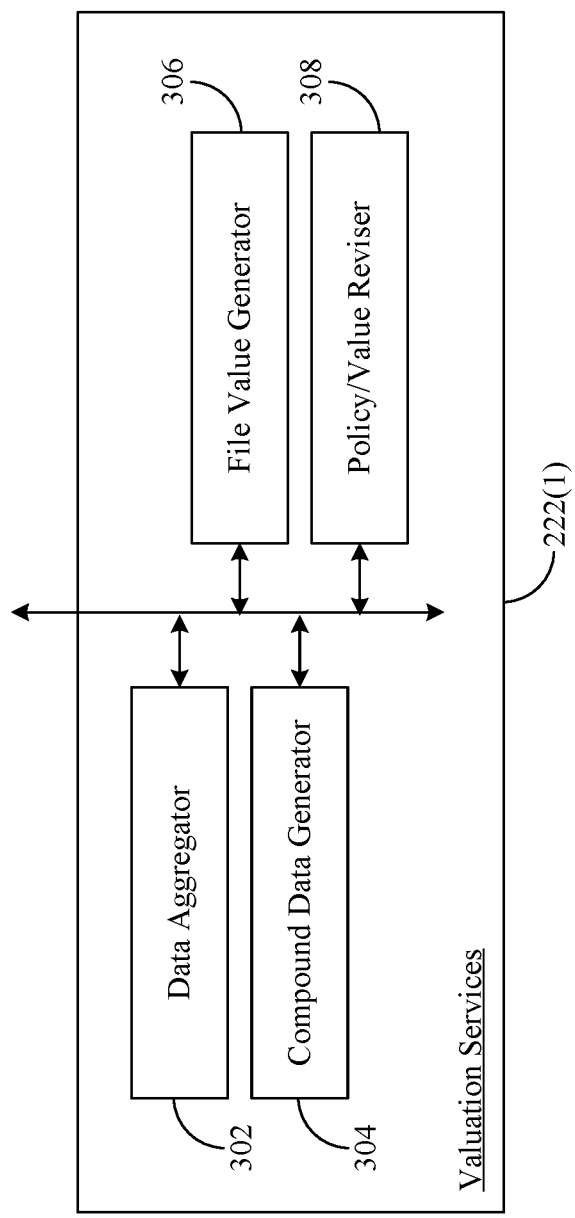
FIG. 3 is a block diagram showing valuation services of FIG. 2 in greater detail.

FIG. 3 is a block diagram showing valuation services 222(1). Valuation services 222(1) can be software modules running in working memory 214(1) and include a data aggregator 302, a compound data generator 304, a file value generator 306, and a policy/value reviser 308. Data aggregator 302 receives raw data relevant to the valuation process via local network adapter 224(1) and, optionally, WAN adapter 208 and organizes the data into a relational database structure stored in governance database 206. Compound data generator 304 accesses the data stored in governance database 206 to generate compound data and organize the compound data into a relational database structure stored in governance database 206. The compound data is indicative of relationships between various data objects, users, user groups, etc. that are useful for determining the values of data objects. File value generator 306 utilizes data generated by data aggregator 302 and compound data generator 304 to determine the values of data objects and organize the values in a relational database structure stored in governance database 206. Policy/value reviser 308 utilizes machine learning and user feedback to review and revise object values and related data policy and to improve the valuation process.

Although shown as software modules in working memory 214(1) being executed by a processor, the functionality of valuation services 222 can be implemented with software, hardware, firmware, or any combination thereof. In addition, any of the methods disclosed herein can be implemented with an electronically-readable medium having code embodied therein for causing an electronic device to carry out the relevant function(s)/method(s).

Figure 4:
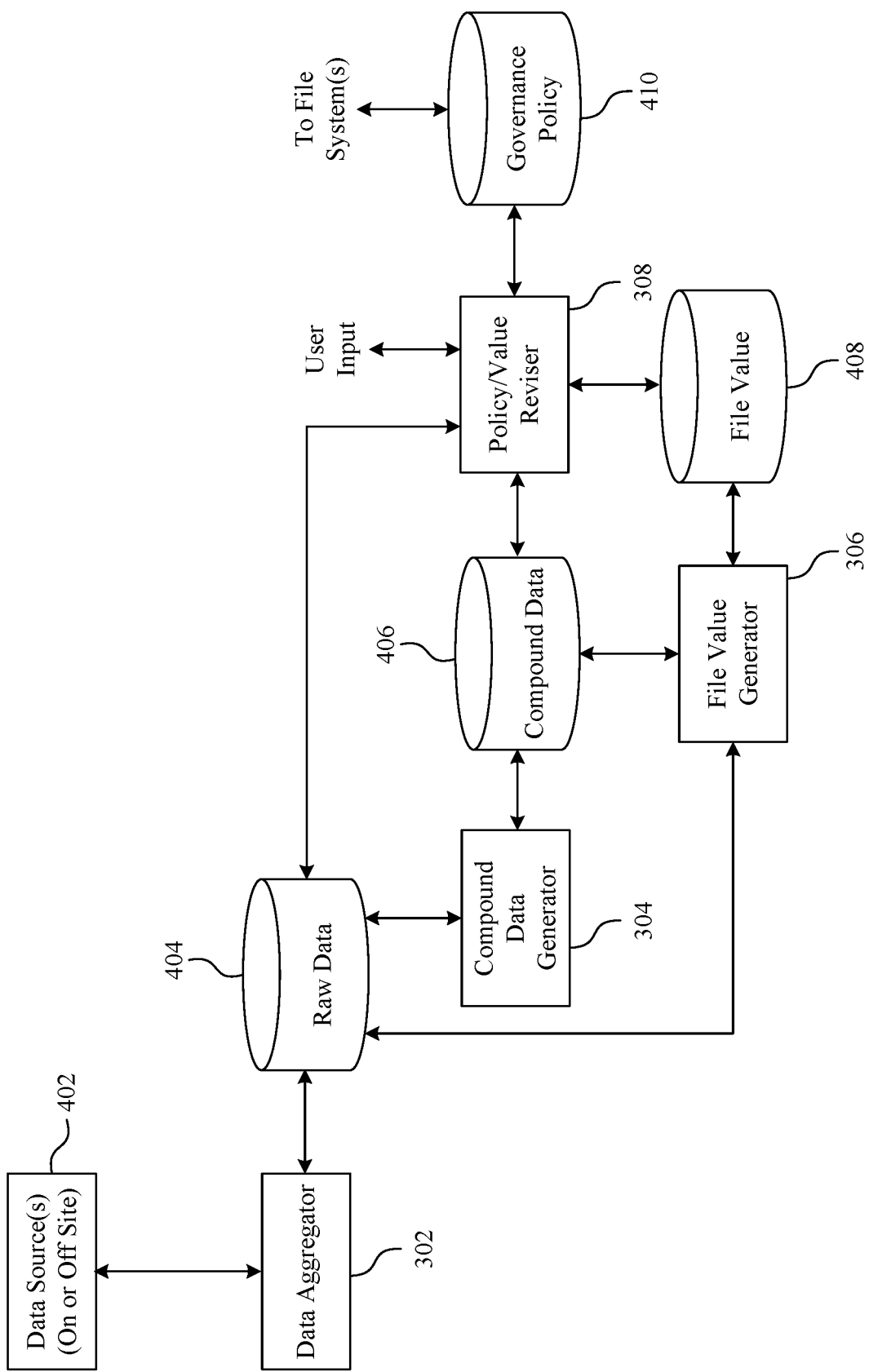
FIG. 4 is a data flow diagram illustrating the process of determining file values.

FIG. 4 is a data flow diagram illustrating the process of determining file values. Data aggregator 302 retrieves data from data source(s) 402, which can include multi-tenant storage devices 204 and/or data stored on local cloud 104, available via the Internet, etc. The received data includes, but is not limited to, file content, file metadata, file access data, user/user-group data, organizational data (related to the cloud customer), and/or infrastructure data. Data aggregator 302 organizes the data into a raw data database 404. Database 404 is a relational database that is query-able and accessible to compound data generator 304, file value generator 306, and policy/value reviser 308. The data structures contained in database 404 are discussed below, in detail, with reference to FIGS. 6A-6C. Compound data generator 304 queries the raw data in database 404 in order to generate compound data based on the raw data. The compound data includes, but is not limited to, file similarity data, statistical data, user quality data, and/or relative file/user metrics. Compound data generator 304 organizes the data into a compound data database 406. Database 406 is a relational database that is query-able and accessible to file value generator 306 and policy/value reviser 308. The data structures contained in database 406 are discussed below, in detail, with reference to FIGS. 7A-7B. Databases 404 and 406 contain all the necessary data to generate values of file system objects stored on multi-tenant storage devices 204 and/or local cloud 104.

File value generator 306 generates file values for at least a portion of the file objects owned by a cloud customer associated with remote cloud 102. File values are, for example, numerical representations of the values of files to the cloud customer (e.g. a business) from various perspectives. Each valued file has at least one associated file value, but can have many. For example, each file object can have a value from a data security perspective as well as a business continuity perspective (i.e. how important the file is for the everyday operations of the business). File value generator 306 accesses data stored in databases 404 and 406, in order to gather data associated with each file object. The gathered data is indicative of the value of each file object from the various perspectives (i.e. value categories). For example, a file that is accessed often by a large number of users in the business (e.g. a pricing table) will be valued highly in the business continuity value category, while a file that is accessed by only a limited number of users in a select group will be valued highly in the data security value category. File value generator 306 generates the values for each file from a particular perspective by weighting each piece of data based on relevance to the particular perspective. For example, from a business continuity perspective, how often an object is accessed and by how many users is of primary importance, whereas the content, location, and/or size of the file are of lesser or no importance. File value generator 306 then organizes all the file values in a file value database 408. Database 408 is a relational database that is query-able and accessible by policy/value reviser 308. In addition to the file valuations, database 408 includes data useful to provide file values in terms of monetary currency. The data structures contained in database 408 are discussed below, in detail, with reference to FIG. 8.

Once the file values have been generated and stored, they are accessed by policy/value reviser 308 to inform information technology (IT) policies and practices of the business, as well as to evaluate and refine the valuations themselves.

Policy/value reviser 308 utilizes user feedback, which it gathers through user input and stores in database 408. Policy/value reviser 308 utilizes the user feedback, as well as data from databases 404 and 406 to determine whether file values should be raised, lowered, or maintained at their current values. Additionally, policy/value reviser 308 utilizes the file values to influence decisions regarding data governance. Particularly, policy/value reviser 308 revises policies stored in a governance policy database 410.

For example, policy/value reviser 308 can alter a policy that causes particular files to be stored with more or fewer backups, in more or less expensive storage devices, etc. Database 410 is a relational database that is query-able and can be accessible to other components of remote cloud 102 and/or local cloud 104. Databases 404, 406, 408, and 410 represent various portions of governance database 206 (FIG. 2).

In addition to user input, data aggregator 302, compound data generator 304, file value generator 306, and policy/value reviser 308 utilize machine learning to refine the process of generating file values. For example, compound data generator 304 can track how often various forms of compound data are utilized in generating file values and generate more or less similar data in the future. As another example, policy/value reviser 308 can recognize how file-level attributes change with changes to file values, and utilize this information in generating future file values. These examples are not intended to be limiting, as the components of valuation services 222(1) can utilize any relevant machine learning technique, including those yet to be invented.

Figure 5:
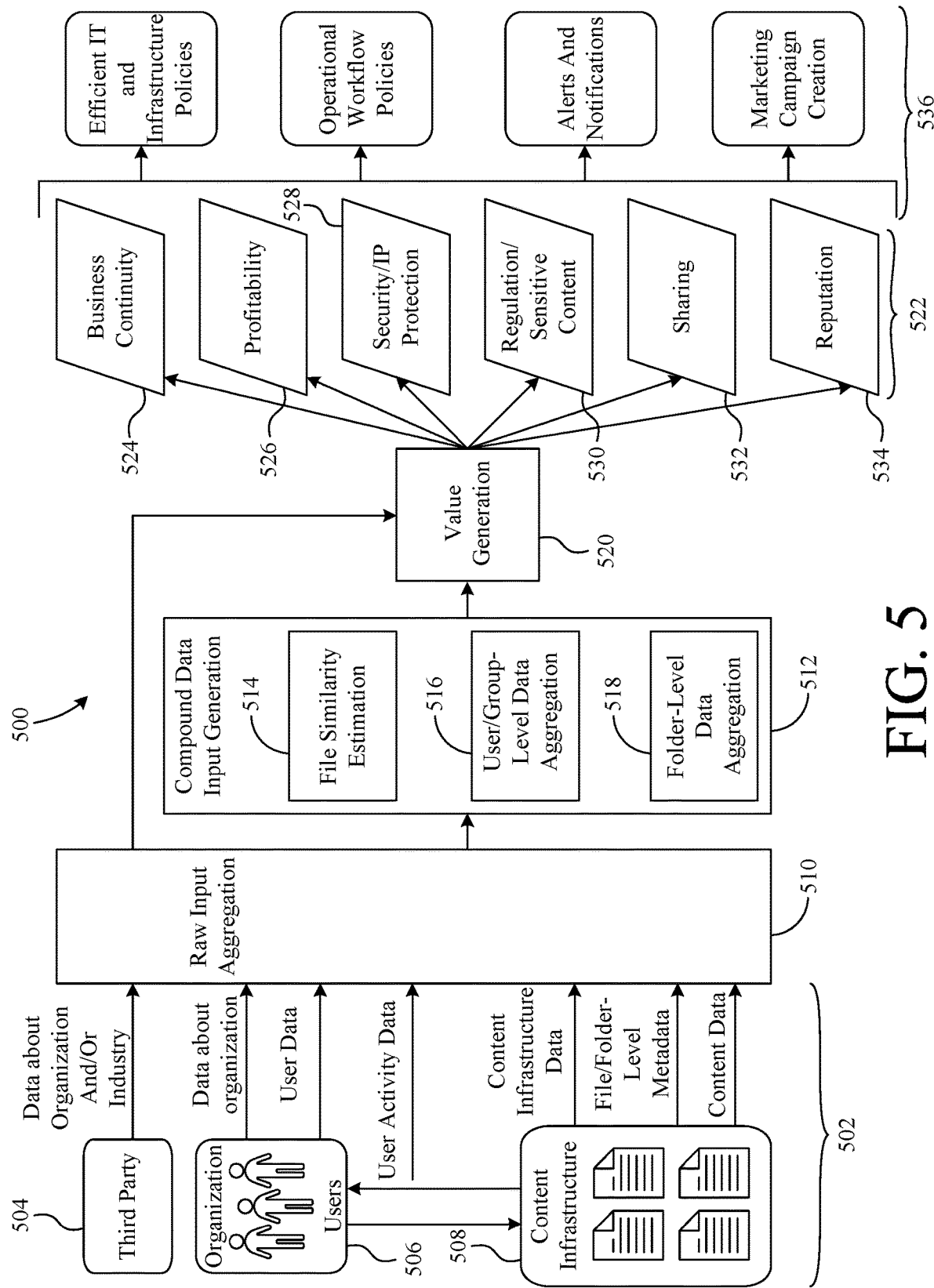
FIG. 5 is a block diagram summarizing an example process flow of the value generating systems of FIG. 1.

FIG. 5 is a block diagram summarizing an example process flow 500 of value generating systems 112, 120, and/or 106. In a first part 502 of process flow 500, raw data is gathered from several different sources, including a third party 504, an associated organization 506 and its users, and content infrastructure 508. Third party 504 can be, by way of non-limiting example, a trade association, a regulatory body, a news outlet, etc. Data gathered from third party 504 (and other third parties) includes, at least, data about organization 506 and/or the associated industry, such as industry type, average company size within the industry, average revenue within the industry, etc. Organization 506 is the cloud customer utilizing the valuation services. Data can be gathered from storage devices, communications, publications, etc., which are owned by or associated with organization 506. The gathered data can include, for example, data about the organization, such as employment statistics, costs, revenue, etc. The users of organization 506 are the people within the organization (e.g. employees) that utilize user accounts to view, create, copy, delete, or otherwise access or modify data objects belonging to organization 506. Data gathered from the users includes user data, such as user permissions, user groups, etc. User activity data, such as object access statistics, is also gathered whenever a user of organization 506 interacts with data stored on content infrastructure 508. Content infrastructure 508 includes, for example, the data storage infrastructure utilized to store and access data owned by organization 506. Data gathered from content infrastructure 508 includes data about the content infrastructure itself, such as device types and locations, as well as data about the data objects stored within content infrastructure 508, such as file- and/or folder-level metadata and/or content data (i.e. content of the files/objects themselves). All of the data gathered in part 502 of process flow 500 can be relevant to the valuations of individual files or groups of files, in either absolute terms, relative terms, or as expressed in the form of a monetary currency. For example, the revenue of organization 506 is important, but not necessary, for expressing the value of files in the form of a monetary currency.

In a second part 510 of process flow 500, the raw data gathered in first part 502 is aggregated and organized into a relational database structure that can be accessed and modified for the purposes of generating compound data and file values. In a third part 512 of process flow 500, the aggregated raw data is utilized to generate compound data, which is indicative of, among other things, relationships between data objects, users, user groups, entity type, and so on. Third part 512 of process flow 500 includes, for example, a file similarity estimation 514, a user/group-level data aggregation 516, and a folder-level data aggregation 518. File similarity estimation 514 utilizes file content data to determine the similarity between different files in order to, for example, allow IT personnel to locate different instances of the same file, protect sensitive content, etc. User/group level data aggregation 516 utilizes user data as well as user activity data to generate statistical data relating users, groups of users, and data objects, in order to aid IT personnel in recognizing and reacting to suspicious activity, data access trends, etc. Folder level aggregation 518 utilizes file and folder metadata to generate folder-level data indicative of folder contents within the file system hierarchy of organization 506. Folder-level data is utilized to generate aggregate values of folders containing pluralities of files, the aggregate folder values being important from a data storage, access, and security standpoint. Folder-level data is useful in protecting valuable data without compromising the overall structure of the file system hierarchy. The data generated in part 512 of process flow 500 is useful in generating accurate file valuations, by providing complex file system information in an easily digestible format.

In a fourth part 520 of the process flow 500, the compound data is utilized to generate file values in a plurality of value categories 522. Value categories 522 include, by way of non-limiting example, a business continuity category 524, a profitability category 526, a security/IP protection category 528, a regulation/sensitive content category 530, a sharing category 532, and a reputation category 534. A file value in business continuity category 524 is indicative of the impact of a corresponding file on the organization's day-to-day operations. For example, a file that is accessed often by a large number of users will likely have a high value in business continuity category 524. A file value in profitability category 526 is indicative of the impact of a corresponding file on cost and revenue. For example, a file that contains information that is important for minimizing costs or maximizing revenue will likely have a high value in profitability category 526. A file value in security/IP protection category 528 is indicative of the value of a corresponding file from a security/IP protection perspective. For example, a file that includes information about an undisclosed invention will likely have a high value in security/IP protection category 528. A file value in regulation/sensitive content index 530 is indicative of the value of a corresponding file from a regulation/sensitive content perspective. For example, a file that includes information protected by The Health Insurance Portability and Accountability Act (HIPAA) will likely have a high value in regulation/sensitive content category 530. A file value in sharing category 532 is indicative of the value of a corresponding file from a sharing perspective. For example, a file that includes an ad intended for use in a viral marketing campaign will likely have a high value in sharing category 532. A file value in reputation category 534 is indicative of the value of a corresponding file from a reputation perspective. For example, a file containing information that could damage the reputation of organization 506 will likely have a high value in reputation category 534 (indicating that the file should be protected). Each file can have a value, and in fact different values, in any number of value categories 522. For example, many files might have a high value in both business continuity category 524 and profitability category 526, as a file that is important for day-to-day operations will likely also be important for maximizing profits. As another example, a file that contains confidential patient information may have a high value in both security/IP protection category 528 and regulation/sensitive content category 530, but have a low value (or no value at all) in sharing category 532.

In a fifth part 536 of process flow 500, the file values are utilized to inform organizational policies related to data storage, access, availability, etc. The file values are utilized to define efficient IT, infrastructure, and operational workflow policies, set up alerts and notifications, and create marketing campaigns. For example, files having high values in security/IP protection category 528 can be stored in more secure forms of storage (e.g., behind firewalls, encrypted, and so on), whereas files having high values in sharing category 532 can be stored in more accessible forms of storage. Additionally, files having high values in business continuity category 524 can be stored in multiple locations close to the users accessing them. As another example, files with high values in profitability category 526 can have more backups than other files. As yet another example, files having high values in security/IP protection category 528 and/or regulation/sensitive content category 530 can be protected with alerts or notifications to IT personnel upon any access. As yet another example, files having high values in sharing category 532 can be utilized in creating marketing campaigns for widespread sharing and access.

Figure 6A:
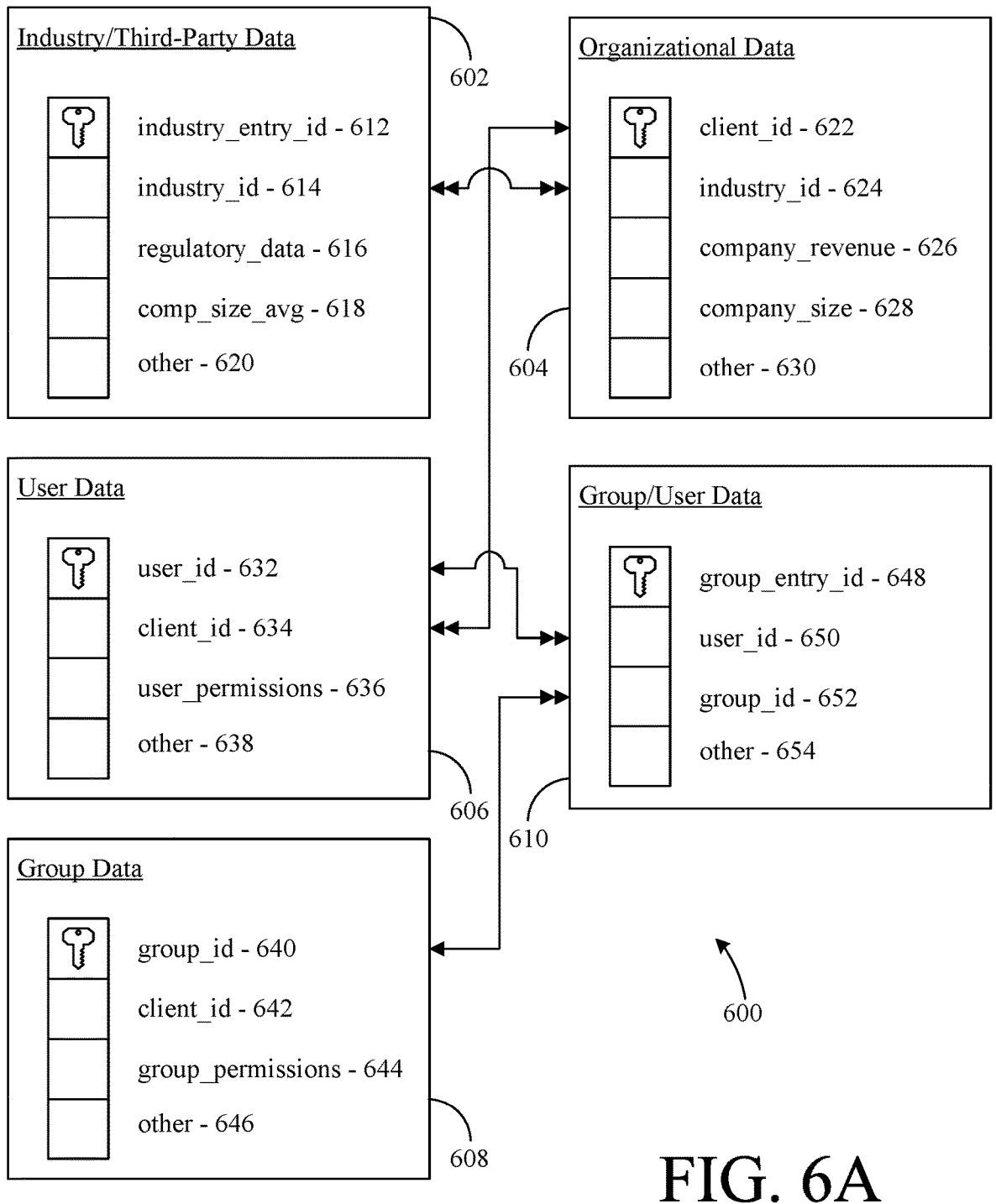
FIG. 6A is a diagram showing a portion of an example database schema of a raw data database of FIG. 4.
Figure 6B:
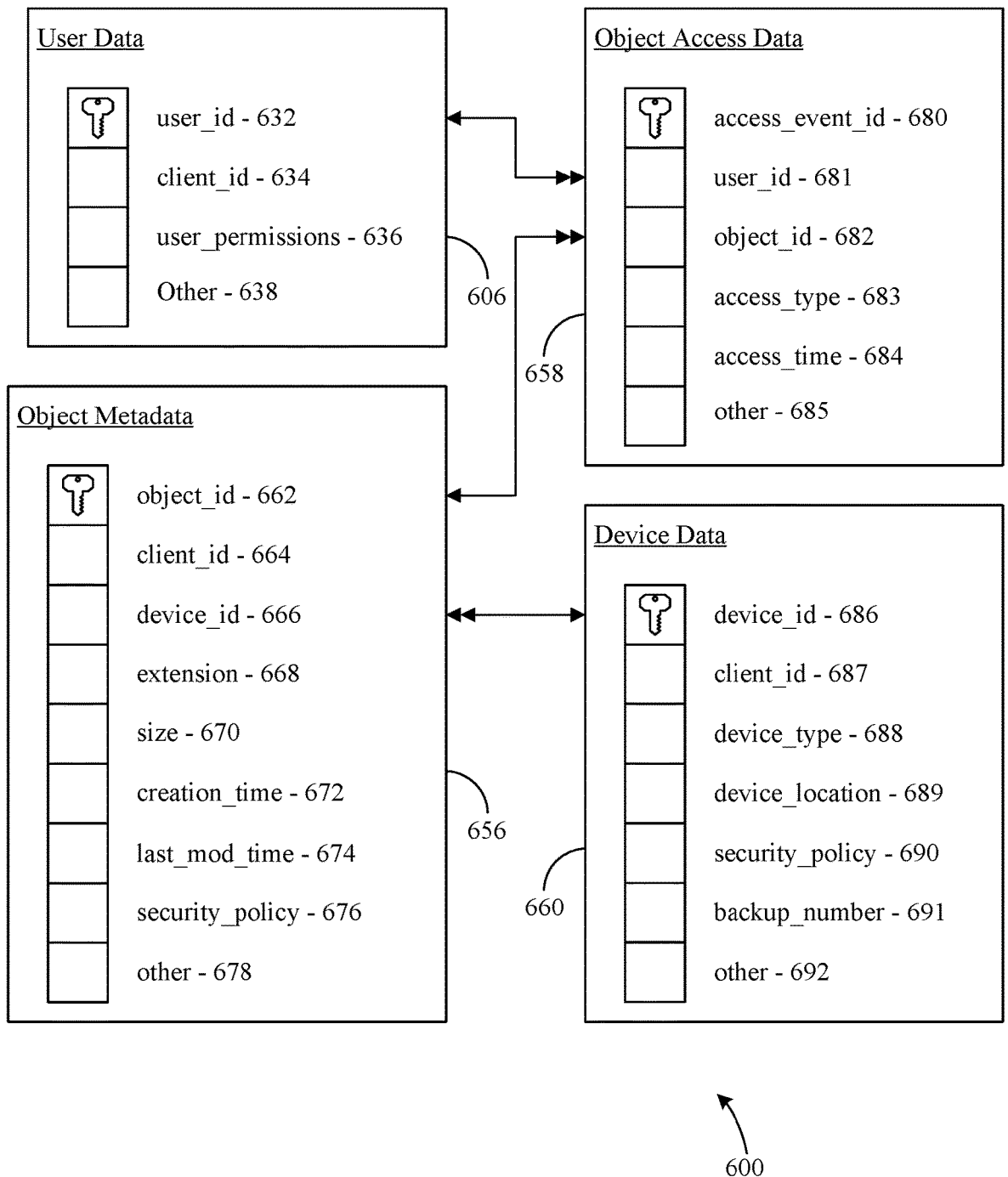
FIG. 6B is a diagram showing another portion of the database schema of FIG. 6A.
Figure 6C:
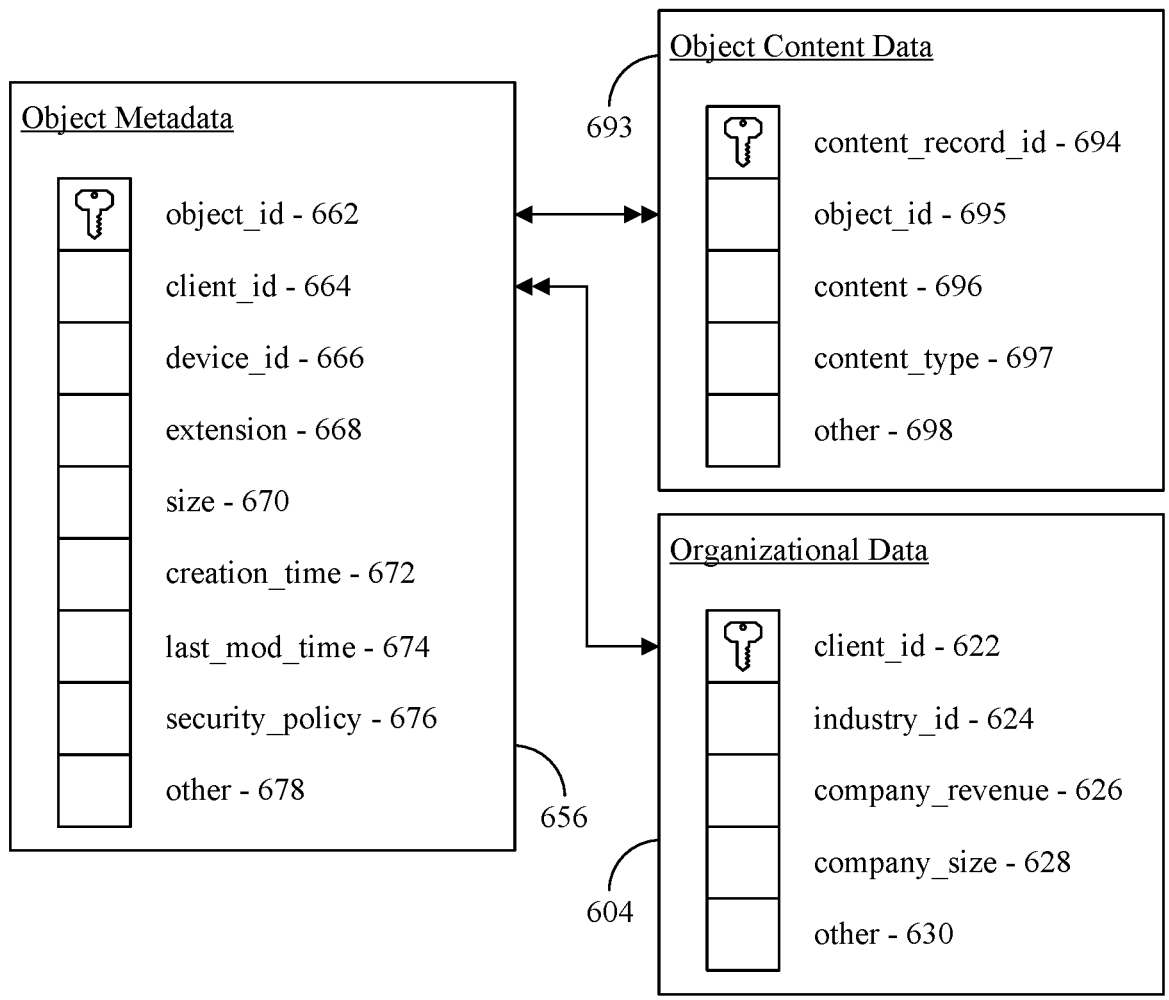
FIG. 6C is a diagram showing yet another portion of the database schema of FIG. 6A.

FIGS. 6A-6C are diagrams illustrating an example database schema 600 of raw data database 404. FIG. 6A shows a portion of database schema 600, including an industry/third party data table 602, an organizational data table 604, a user data table 606, a group data table 608, and a group/user data table 610.

Each record in industry/third party data table 602 includes an industry_entry_id field 612, an industry_id field 614, a regulatory_data field 616, a comp_size_avg field 618, and an other field 620. A record is created in industry/third party data table 602 each time a new piece of data corresponding to a particular industry (or more than one industry) is received by data aggregator 302.

Industry_entry_id field 614 is the key field of industry/third party table 602 and an alphanumeric string, which uniquely identifies each record of table 602. Industry_id field 614 contains data that uniquely identifies the industry (e.g., healthcare, cloud computing, law, etc.), or a group of industries, corresponding to the record. Regulatory_data field 616 contains data indicative of a piece of regulatory_data, such as a new regulatory requirement (e.g., certain documents are client privileged). Comp_size_avg field 618 contains data indicative of the average size of companies in the industry specified by industry_id field 614. Typically a record having an entry in comp_size_avg field 618 is created initially and updated on a regular basis (e.g., once a year). In other entries comp_size_avg field 618 can have a null value. Other field 620 represents one or more additional fields that can contain data indicative of any other information that might be relevant to a particular industry.

Each record in organizational data table 604 includes a client_id field 622, an industry_id field 624, a company_revenue field 626, a company_size field 628, and an other field 630. A record is created in organizational data table 604 for each cloud customer utilizing the valuation services.

Client_id field 622 is the key field of organizational data table 604 and an alphanumeric string, which uniquely identifies each cloud customer utilizing the valuation services. Industry_id field 624 contains data indicative of the industry that the cloud customer belongs to. Industry_id field 624 is analogous to industry_id field 614 of table 602; identical alphanumeric strings in industry_id field 624 and industry_id field 614 refer to the same industry. Industry_id field 624 and industry_id field 614 create a many-to-many relationship between organizational data table 604 and industry/third party data table 602, because each industry can have many entries in table 604, as well as many entries in table 602. Company_revenue field 626 contains data indicative of the cloud customer's revenue. Company_size field 628 contains data indicative of the size of the cloud customer (e.g. number of employees). Other field 630 contains data indicative of any other data that might be relevant to a particular cloud customer.

Each record in user data table 606 includes a user_id field 632, a client_id field 634, a user_permissions field 636, and an other field 638. A record is created in user data table 606 for each user (i.e. a user profile with access to the data objects being valued) in a cloud customer's file system.

User_id field 632 is the key field of user data table 606 and an alphanumeric string, which uniquely identifies each user. Client_id field 634 contains data indicative of the cloud customer associated with the user. Client_id field 634 is analogous to client_id field 622 of table 604. Client_id field 634 and client_id field 622 create a many-to-one relationship between table 606 and table 604, because each cloud customer is associated with many users, but each user is only associated with one cloud customer. User_permissions field 636 contains data indicative of object permissions associated with the user. (It should be noted that user permissions can, alternatively, be entered in a completely separate table, which relates users, objects, and permissions on an individual basis.) Other field 638 represents one or more additional fields that can contain data indicative of any other data that might be relevant to a particular user.

Each record in group data table 608 includes a group_id field 640, a client_id field 642, a group_permissions field 644, and an other field 646. A record is created in group data table 608 each time a group is created in a cloud customer's file system.

Group_id field 640 is the key field of group data table 608 and an alphanumeric string, which uniquely identifies each group. Client_id field 642 contains data indicative of the cloud customer associated with the group. Although not shown, client_id field 642 creates a many-to-one relationship between group data table 608 and organizational data table 604, because each cloud customer is associated with many groups, but each group is associated with only one cloud customer. Group_permissions field 644 contains data indicative of object permissions associated with the group. (It should be noted that group permissions can also be entered in a separate table, which relates groups, objects, and permissions on an individual basis.) Other field 646 represents one or more additional fields that can contain data indicative of any other data that might be relevant to a particular group.

Each record in group/user data table 610 includes a group_entry_id field 648, a user_id field 650, a group_id field 652, and an other field 654. A record is created in group/user data table 610 each time a user is added to a group.

Group_entry_id field 648 is the key field of group/user data table 610 and an alphanumeric string, which uniquely identifies each entry in table 610. User_id field 650 and group_id field 652 together indicate that a specified user belongs to a specified group. User_id field 650 is analogous to user_id field 632 of table 606. Therefore, user_id field 650 and user_id field 632 create a many-to-one relationship between group/user data table 610 and user data table 606, because each user is associated with many group/user entries, but each group/user entry is only associated with a single user. Group_id field 652 is analogous to group_id field 640 of table 608. Therefore, group_id field 652 and group_id field 640 create a many-to-one relationship between group/user data table 610 and group data table 608, because each group is associated with many group/user entries, but each group/user entry is only associated with a single group. Other field 654 represents one or more additional fields that can contain data indicative of any other data that might be relevant to a particular group/user data entry.

FIG. 6B shows another portion of database schema 600, including user data table 606, an object metadata table 656, an object access data table 658, and a device data table 660. User data table 606 is shown here (as well as in FIG. 6A) in order to clearly illustrate the relationships between the tables.

Each record in object metadata table 656 includes an object_id field 662, a client_id field 664, a device_id field 666, an extension field 668, a size field 670, a creation_time field 672, a last_mod_time field 674, a security_policy field 676, and an other field 678. A record is created in object metadata table 656 each time an object is created in the cloud customer's file system.

Object_id field 662 is the key field of object metadata table 656 and contains data that uniquely identifies each file object. Client_id field 664 contains data that identifies the cloud customer associated with object. Client_id field 664 creates a relationship between object metadata table 656 and any other table containing a client_id field. Device_id field 666 contains data that identifies a device on which the object is stored. Extension field 668 contains data that identifies a file extension of the object. Size field 670 contains data that identifies a size of the object. Folders have a default entry of zero (0) in size field 670. Creation_time field 672 contains data that identifies a date and time that the file was created. Last_mod_time field 674 contains data that identifies a date and time that the file was last modified. Security_policy field 676 contains data that indicates a particular security policy (or multiple policies) that is applied to the object. Other field 678 represents one or more additional fields that can contain data indicative of any other data that might be relevant to a particular data object.

Each record in object access data table 658 includes an access_event_id field 680, a user_id field 681, an object_id field 682, an access_type field 683, an access_time field 684, and an other field 685. A record is created in object access data table 658 each time a data object is accessed on the cloud customer's file system.

Access_event_id field 680 is the key field of object access data table 658 and an alphanumeric string, which uniquely identifies each object access record. User_id field 681 is analogous to user_id field 632 of table 606. Therefore, user_id field 681 and user_id field 632 create a many-to-one relationship between object access data table 658 and user data table 606, because each user is associated with many access events, but each access event is only associated with a single user. Object_id field 682 is analogous to object_id field 662 of table 656. Therefore, object_id field 682 and object_id field 662 create a many-to-one relationship between object access data table 658 and object metadata table 656, because each object is associated with many access events, but each access event is only associated with a single object. Access_type field 683 contains data that identifies how the object was accessed (e.g., READ, WRITE, DELETE, etc.). Access_time field 684 contains data that identifies a date and time that the access occurred. Other field 685 represents one or more additional fields that can contain data indicative of any other data that might be relevant to a particular object access event.

Each record in device data table 660 includes a device_id field 686, a client_id field 687, a device_type field 688, a device_location field 689, a security_policy field 690, a backup_number field 691, and an other field 692. A record is created in device data table 660 for each storage device in the cloud customer's file system.

Device_id field 686 is the key field of device data table 660 and an alphanumeric string, which uniquely identifies each storage device. Device_id field 686 is analogous to device_id field 666 of table 656. Therefore, device_id field 686 and device_id field 666 create a one-to-many relationship between device data table 660 and object metadata table 656, because each storage device is associated with many objects, but each object is only associated with a single storage device. Client_id field 687 contains data that identifies the cloud customer associated with the storage device (and is analogous to other client_id fields in other data tables). Device_type field 688 contains data that identifies a type (e.g., SSD, HD, Flash, Disk, etc.) of the storage device. Device_location field 689 contains data that identifies a location (e.g., Chicago office, accounting department, a domain name, etc.) of the storage device. Security_policy field 690 contains data indicative of a security policy that is applied to the storage device. Backup_number field 691 contains data indicative of the number of backups of the storage device that exist. Other field 692 represents one or more additional fields that can contain data indicative of any other data that might be relevant to a particular storage device.

FIG. 6C shows yet another portion of database schema 600, including organizational data table 604, object metadata table 656, and an object content data table 693. Organizational data table 604 and object metadata table 656 are shown here (as well as in FIGS. 6A and 6B, respectively) in order to clearly illustrate the relationships between the tables.

Object metadata table 656 and organizational data table 604 are related by client_id field 664 and client_id field 622. Client_id field 664 and client_id field 622 create a many-to-one relationship between object metadata table 656 and organizational data table 604, because each cloud customer is associated with many objects, but each object is only associated with a single cloud customer.

Object content data table 693 contains a content_record_id field 694, an object_id field 695, a content field 696, a content_type field 697, and an other field 698. A record is created in object content data table 693 each time data aggregator 302 receives data indicative of the content of a file system object.

Content_record_id field 694 is the key field of object content data table 693 and an alphanumeric string, which uniquely identifies each record in table 693. Object_id field 695 contains data indicative of the object associated with the record. Object_id field 695 is analogous to object_id field 662 of table 656. Therefore, object_id field 695 and object_id field 662 create a many-to-one relationship between object content data table 693 and object metadata table 656, because each object is associated with many content records, but each content record is only associated with a single object. Content field 696 contains data indicative of at least a portion of the content of the object. Content_type field 697 contains data indicative of a type (e.g., non-disclosure agreement (NDA), HIPAA, financial, social security number, etc.) of the content identified by content field 696. Other field 698 represents one or more additional fields that can contain data indicative of any other information that might be relevant to a particular object content data entry.

Figure 7A:
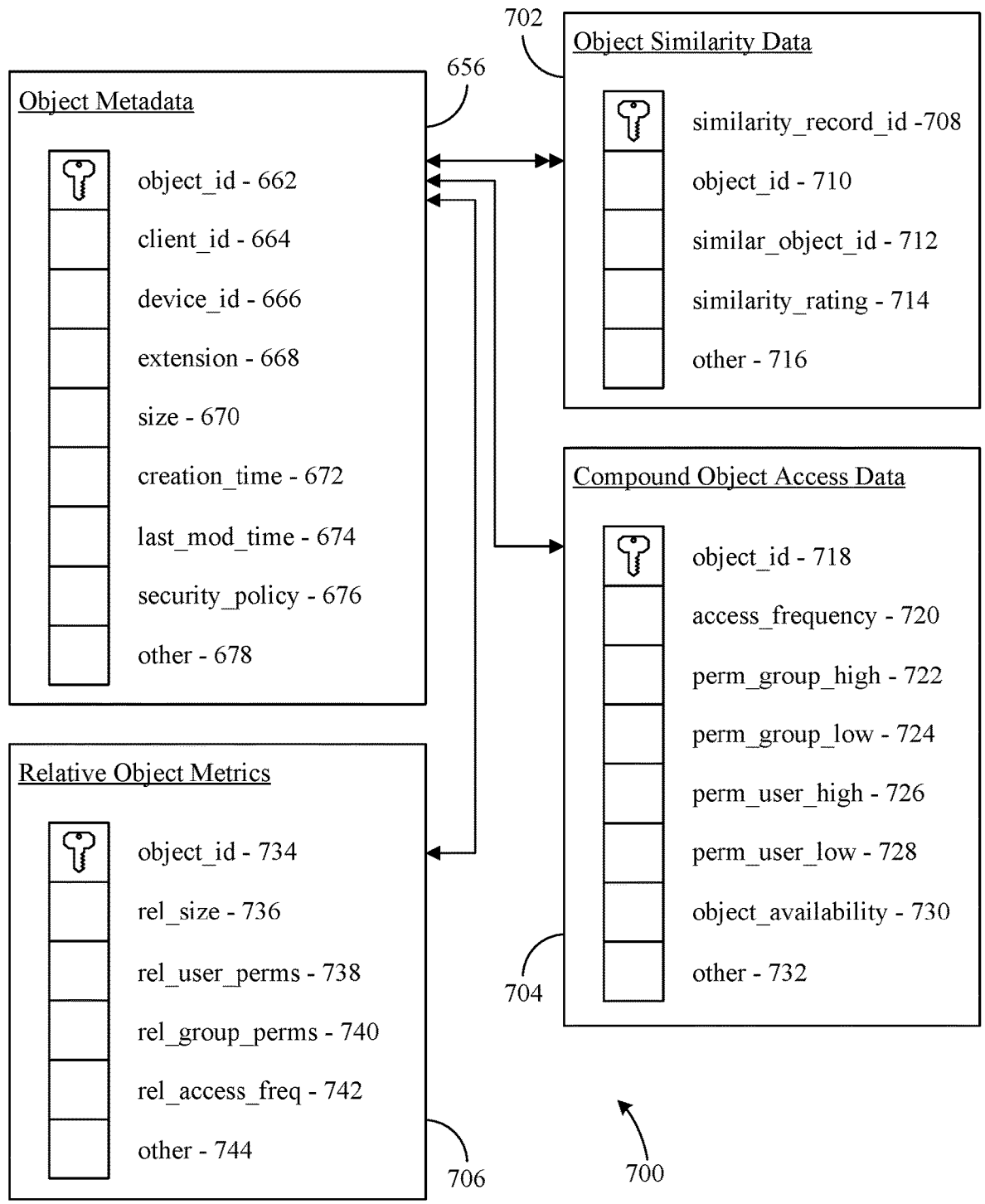
FIG. 7A is a diagram showing a portion of an example database schema of a compound data database of FIG. 4.
Figure 7B:
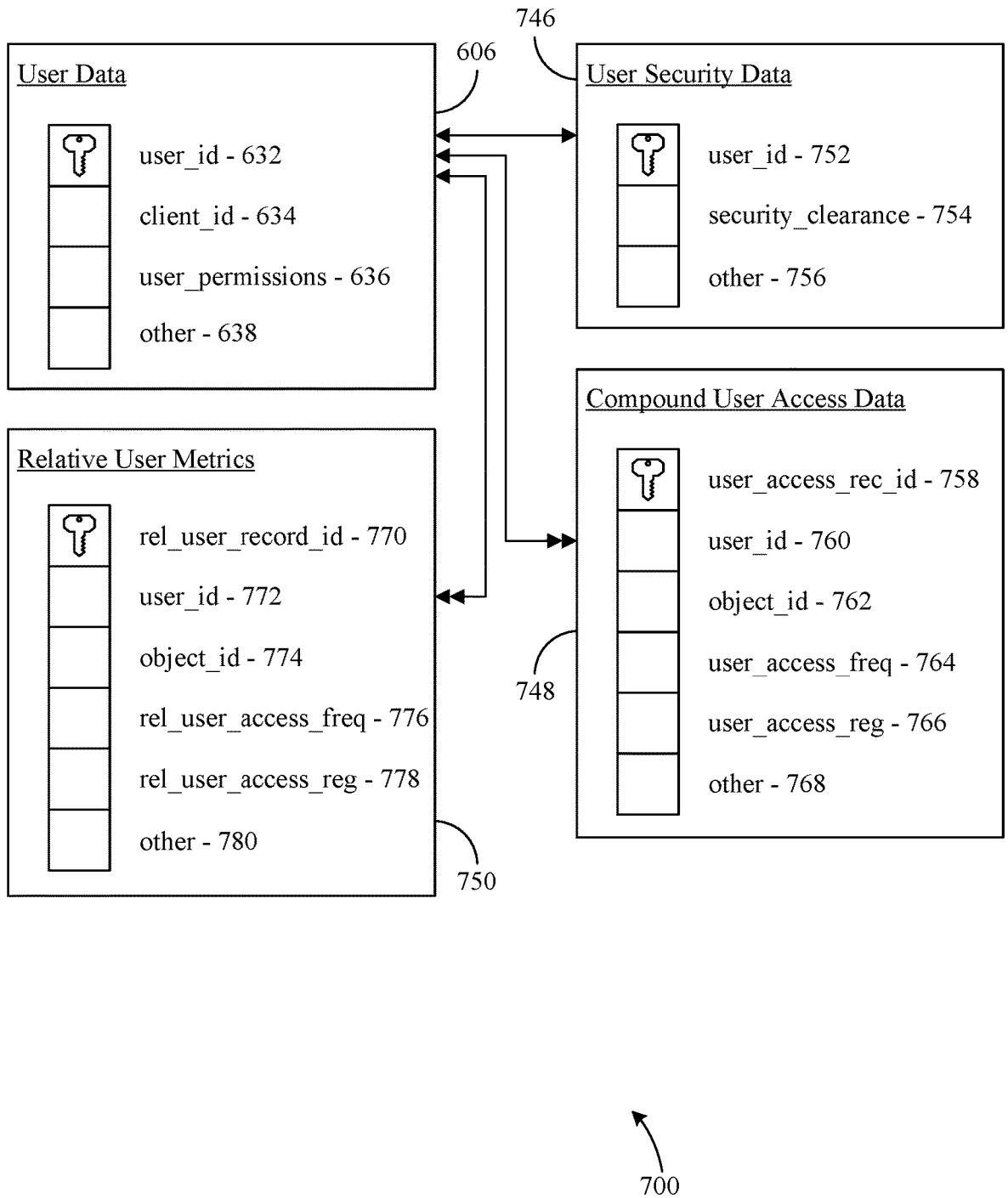
FIG. 7B is a diagram showing another portion of the database schema of FIG. 7A.

FIGS. 7A and 7B are diagrams illustrating an example database schema 700 of compound data database 406. FIG. 7A shows a portion of database schema 700, including object metadata table 656, an object similarity data table 702, a compound object access data table 704, and a relative object metrics table 706. It should be noted that although object metadata table 656 is shown in both raw data database 404 and compound data database 406, it is only saved once in governance database 206 (aside from any backup copies).

Object similarity data table 702 includes a similarity_record_id field 708, an object_id field 710, a similar_object_id field 712, a similarity_rating field 714, and an other field 716. A record is created in object similarity data table 702 each time compound data generator 304 performs a comparison of two data objects or, alternatively, if compound data generator 304 finds that two objects have a similarity higher than a threshold similarity. Compound data generator 304 utilizes data from object metadata table 656 and object content data table 693 to generate object similarity data table 702.

Similarity_record_id 708 is the key field of object similarity data table 702 and an alphanumeric string, which uniquely identifies each record in object similarity data table 702. Object_id 710 contains data uniquely identifying a particular data object. Object_id field 710 is analogous to object_id field 662 and, therefore, creates a many-to-one relationship between object similarity data table 702 and object metadata table 656, because each object similarity record corresponds to only one data object, but each data object can correspond to many object similarity records. Similar_object_id field 712 contains data uniquely identifying a particular data object that has been compared to the data object identified by object_id field 710 to determine similarity. For each object comparison there will be two records in object similarity data table 702: one from the perspective of the object identified by object_id field 710 and another from the perspective of the object identified by similar_object_id field 712. Similarity_rating field 714 contains data indicative of the similarity (e.g., 50%, 100%, etc.) between the data objects. Other field 716 represents one or more additional fields that can contain data indicative of any other data that might be relevant to an object similarity record.

Compound object access data table 704 includes an object_id field 718, an access_frequency field 720, a perm_group_high field 722, a perm_group_low field 724, a perm_user_high field 726, a perm_user_low field 728, an object_availability field 730, and an other field 732. A record is created in compound object access data table 704 for each data object in the cloud customer's file system. Compound data generator 304 utilizes data from user data table 606, group data table 608, object metadata table 656 and object access data table 658 to generate compound object access data table 704.

Object_id field 718 is the key field of compound object access data table 704 and an alphanumeric string, which uniquely identifies each data object. Object_id field 718 and object_id field 662 of object metadata table 656 create a one-to-one relationship between records in compound object access data table 704 and object metadata table 656, because each compound object access record corresponds to only one object and each object corresponds to only one compound object access record. Access_frequency field 720 contains data indicative of the frequency (e.g. 100 times per day) that the data object identified by object_id field 718 is accessed. Perm_group_high field 722 contains data indicative of the group permitted to access the object that has the highest security clearance (i.e. the most relaxed permissions). Perm_group_low field 724 contains data indicative of the group permitted to access the object that has the lowest security clearance (i.e. the strictest permissions). Perm_group_low field 724 is particularly important for determining data security values, because it is indicative of how secure the object is. For example, if perm_group_low field 724 indicates that executives or IT personnel are the lowest group permitted to access, the corresponding object is most likely highly confidential. Perm_user_high field 726 contains data similar to perm_group_high field 722, but identifies the user, rather than the group, permitted to access having the highest security clearance. Similarly, perm_user_low field 728 contains data similar to perm_group_low field 724, but identifies the user permitted to access having the lowest security clearance. Object_availability field 730 contains data indicative of the accessibility of the data object. For example, object_availability field 730 can indicate how many users in the organization have access to the object, how long it takes for the average user to access the object, how difficult the object is to find, etc. Other field 732 represents one or more additional fields that can contain data indicative of any other information that might be relevant to a compound object access record.

Relative object metrics table 706 includes an object_id field 734, a rel_size file 736, rel_user_perms field 738, a rel_group_perms field 740, a rel_access_freq field 742, and an other field 744. A record is made in relative object metrics table 706 for each object in object metadata table 656. Compound data generator 304 utilizes user data table 606, group data table 608, object metadata table 656, and compound object access data table 704 to generate relative object metrics table 706.

Object_id field 734 is the key field of relative object metrics table 706 and an alphanumeric string, which uniquely identifies each data object. Object_id field 734 and object_id field 662 of object metadata table 656 create a one-to-one relationship between records in relative object metrics table 706 and object metadata table 656, because each relative object metrics record corresponds to only one object and each object corresponds to only one relative object metrics record. Rel_size field 736 contains data that is indicative of the size of the object identified by object_id field 734 relative to the rest of the objects in the cloud customer's file system. For example, rel_size field 736 can indicate that the object is in the $50^{th}$ percentile for object size. Rel_user_perms field 738 contains data indicative of the user permissions associated with the object relative to the rest of the objects. For example, rel_user_perms field 738 can indicate that the object is in the $50^{th}$ percentile for number of open user permissions. Rel_group_perms field 740 contains data indicative of the group permissions associated with the object relative to the rest of the objects. For example, rel_group_perms field 740 can indicate that the object is in the $50^{th}$ percentile for number of open group permissions. Rel_access_freq field 742 contains data indicative of the frequency the data object is accessed relative to the rest of the objects. For example, rel_access_freq field 742 can indicate that the object is in the $50^{th}$ percentile for access_frequency. Other field 744 represents one or more additional fields that can contain data indicative of any other information that might be relevant to the relative metrics associated with a file system object.

FIG. 7B shows a portion of database schema 700, including user data table 606, a user security data table 746, a compound user access data table 748, and a relative user metrics table 750. It should be noted that although user data table 606 is shown in both raw data database 404 and compound data database 406, it is only saved once in governance database 206 (aside from any backup copies).

User security data table 746 includes a user_id field 752, a security clearance field 754 and an other field 756. A record is created in user security data table 746 for each user of the cloud customer's file system. Compound data generator 304 utilizes user data table 606, group data table 608, and user/group data table 610 in order to generate user security data table 746.

User_id field 752 is the key field of user security data table 746 and an alphanumeric string, which uniquely identifies a particular user. User_id field 752 and user_id field 632 of user data table 606 create a one-to-one relationship between records in user security data table 746 and user data table 606, because each user security record corresponds to only one user and each user corresponds to only one user security record. Security_clearance field 754 contains data indicative of a security clearance of the user identified by user_id field 752. For example, a user with a high level of access might have a "top-secret" clearance identified by security_clearance field 754. Other field 756 represents one or more additional fields that can contain data indicative of any other information that might be relevant to the security data associated with a file system user.

Compound user access data table 748 includes a user_access_rec_id field 758, a user_id field 760, a object_id field 762, a user_access_freq field 764, a user_access_reg field 766, and an other field 768. A record is created in compound user access data table 748 for each user-object pair in the cloud customer's file system. Compound data generator 304 utilizes user data table 606, object metadata table 656, and object access data table 658 to generate compound user access data table 748.

User_access_rec_id field 758 is the key field of compound user access data table 748 and an alphanumeric string, which uniquely identifies each record in compound user access data table 748. User_id field 760 contains data indicative of a particular user. User_id field 760 and user_id field 632 of user data table 606 create a many-to-one relationship between records in compound user access data table 748 and user data table 606, because each compound user access record corresponds to only one user, but each user corresponds to many (one for each file system object) compound user access records. Object_id field 762 contains data indicative of a particular data object. Object_id field 762 is analogous to object_id field 662 of object metadata table 656. User_access_freq field 764 contains data indicative of how often (e.g. 10 times per day, week, year, etc.) the user identified by user_id field 760 accesses the object identified by object_id field 762. User_access_reg field 766 contains data indicative of the regularity (e.g., daily, weekly, etc.) at which the user accesses the object. Other field 768 represents one or more additional fields that can contain data indicative of any other information that might be relevant to the access data associated with a particular user-object pair.

Relative user metrics table 750 includes a rel_user_record_id field 770, a user_id field 772, an object_id field 774, a rel_user_access_freq field 776, a rel_user_access_reg field 778, and an other field 780. A record is created in relative user metrics table 750 for each user-object pair in the cloud customer's file system. Compound data generator 304 utilizes user data table 606, object metadata table 656, and compound user access data table 748 to generate relative user metrics table 750.

Rel_user_record_id 770 is the key field of relative user metrics table 750 and an alphanumeric string, which uniquely identifies each record in relative user metrics table 750. User_id field 772 contains data indicative of a particular user. User_id field 772 and user_id field 632 of user data table 606 create a many-to-one relationship between records in relative user metrics table 750 and user data table 606, because each relative user metrics record corresponds to only one user, but each user corresponds to many (one for each file system object) relative user metrics records. Object_id field 774 contains data indicative of a particular data object. Object_id field 774 is analogous to object_id field 662 of object metadata table 656. Rel_user_access_freq field 776 contains data indicative of how often the user identified by user_id field 772 accesses the object identified by object_id field 774 relative to the rest of the users. For example, rel_user_access_freq 776 might indicate that the user accesses the object more often than 50% of the other users. Rel_user_access_reg field 778 contains data indicative of the regularity at which the user accesses the object relative to the rest of the users. For example, rel_user_access_reg field 778 might indicate that the user accesses the object more regularly than 50% of the other users. Other field 780 represents one or more additional fields that can contain data indicative of any other information that might be relevant to the relative user metrics associated with a particular user-object pair.

Figure 8:
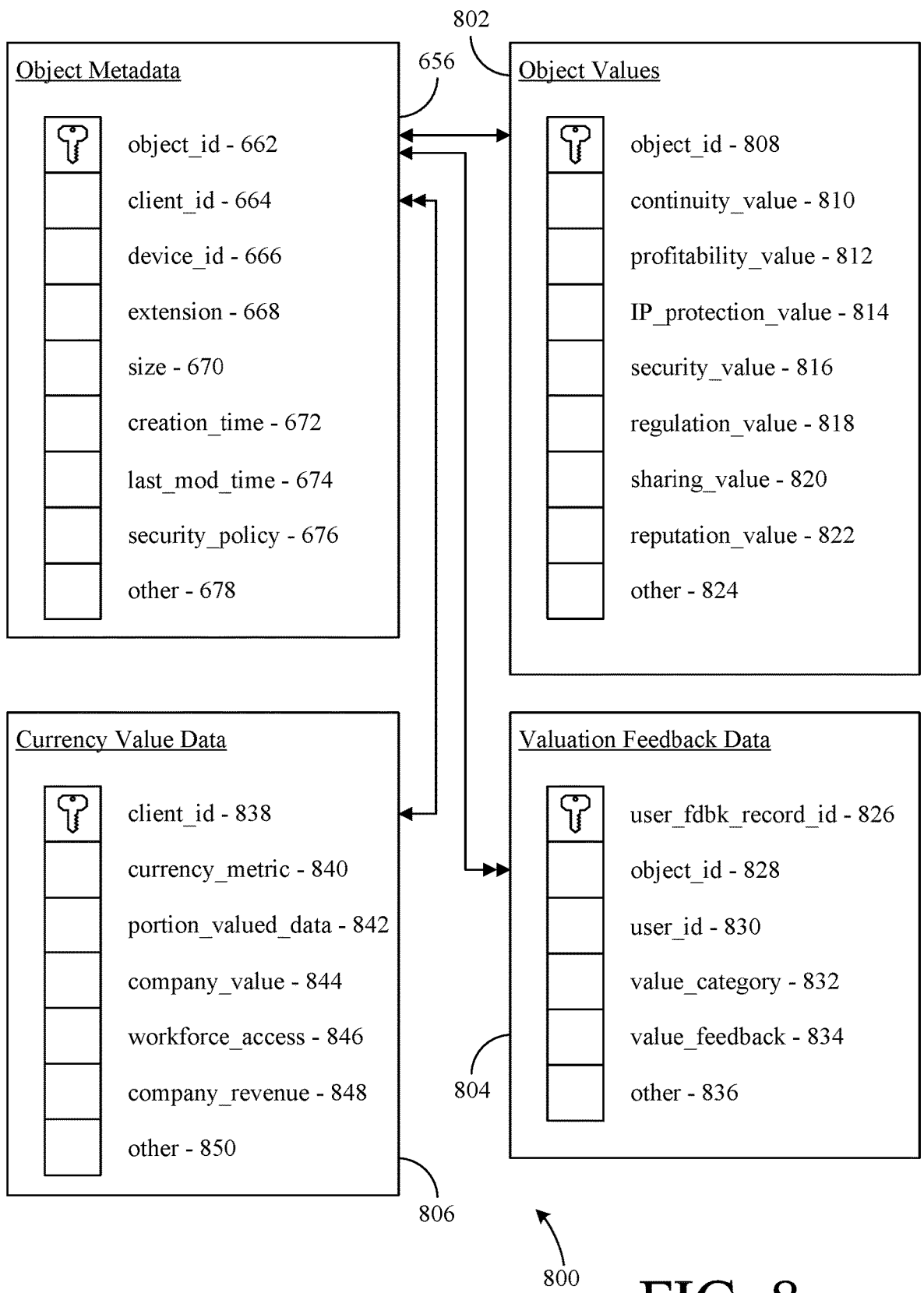
FIG. 8 is a diagram showing an example database schema of a file values database of FIG. 4.

FIG. 8 shows a database schema 800, including object metadata table 656, an object values table 802, a valuation feedback data table 804, and a currency value data table 806. It should be noted that, although object metadata table 656 is shown in all three of raw data database 404, compound data database 406, and file value database 408, it is only saved once in governance database 206 (aside from any backup copies).

Object values table 802 includes an object_id field 808, a continuity_value field 810, a profitability_value field 812, an IP_protection_value field 814, a security_value field 816, a regulation_value field 818, a sharing_value field 820, a reputation_value field 822, and an other field 824. A record is created in object values table 802 for each file system object that is valued. File value generator 306 utilizes data in database schema 600 and database schema 700 as well as valuation feedback data table 804 and currency value data table 806 in order to generate object values table 802.

Object_id field 808 is the key field of object values 802 and an alphanumeric string, which uniquely identifies a particular file system object. Object_id field 808 contains data indicative of a particular data object. Object_id field 808 and object_id field 662 of object metadata table 656 create a one-to-one relationship between records in object values table 802 and object metadata table 656, because each object values record corresponds to only one object and each object corresponds to only one object values record. Continuity_value field 810 contains data indicative of a value of the object identified by object_id field 808 from a business continuity perspective. Profitability_value field 812 contains data indicative of a value of the object from a profitability perspective. IP_protection_value field 814 contains data indicative of a value of the object from a IP protection/sensitivity perspective. Security_value field 816 contains data indicative of a value of the object from a data security perspective. Regulation_value field 818 contains data indicative of a value of the object from a regulation perspective. Sharing_value field 820 contains data indicative of a value of the object from a sharing perspective. Reputation_value field 822 contains data indicative of a value of the object from a reputation perspective. Other field 824 represents one or more additional fields that can contain data indicative of any other information that might be important to an object's value.

Valuation feedback data table 804 includes a user_fdbk_record_id field 826, an object_id field 828, a user_id field 830, a value category field 832, a value feedback field 834, and an other field 836. A record is created in valuation feedback data table 804 each time a user provides feedback about the object values associated with a particular data object. The records are generated by policy/value reviser 308 in response to a user providing the feedback.

User_fdbk_record_id field 826 is the key field of valuation feedback data table 804 and an alphanumeric string, which uniquely identifies each record in valuation feedback data table 804. Object_id field 828 contains data indicative of a particular data object. Object_id field 828 and object_id field 662 of object metadata table 656 create a many-to-one relationship between records in valuation feedback data table 804 and object metadata table 656, because each valuation feedback record corresponds to only one object and each object corresponds to many valuation feedback records. User_id field 830 contains data indicative of a particular user. User_id field 830 is analogous to user_id field 632 of user data table 606. Value_category field 832 contains data indicative of the value category (e.g., continuity_value) the feedback is relevant to. Value_feedback field 834 contains data indicative of the feedback regarding the value of the object identified by object_id field 828 in the value category identified by value category field 832. For example, value_feedback field 834 might indicate that the object is valued too highly from a continuity perspective. Other field 836 represents one or more additional fields that can contain data indicative of any other information that might be important to a valuation feedback record.

Currency value data table 806 includes a client_id field 838, a currency_metric field 840, a portion_valued_data field 842, a company_value field 844, a workforce_access field 846, a company_revenue field 848, and an other field 850. A record is created in currency value data table 806 for each cloud customer. File value generator 306 utilizes currency value data table 806 to express object values in the form of a monetary currency, such as U.S. dollars.

Client_id field 838 is the key field of currency value data table 806 and an alphanumeric string, which uniquely identifies a particular cloud customer. Client_id field 838 and client_id field 664 of object metadata table 656 create a one-to-many relationship between records in currency value data table 806 and object metadata table 656, because each currency value data record corresponds to only one client and each client corresponds to many objects. Through object metadata table 656, currency value data table 806 has a relationship to many other tables, such as object values table 802 and organizational data table 604. Currency_metric field 840 contains data indicative of a relationship between a monetary currency and an object value. For example, currency_metric field 840 might indicate that a given object value corresponds to a value of one U.S. dollar. Portion_value_data field 842 contains data indicative of the portion of the cloud customer's file system that is available to be valued. Company_value field 844 contains data indicative of the value (e.g., 10 million dollars) of the cloud customer in a particular currency. Workforce_access field 846 contains data indicative of the portion of the cloud customer's workforce that has access to the files being valued. Company_revenue field 848 contains data indicative of the revenue of the cloud customer (e.g. 1 million dollars per year) in a particular currency. Other field 850 represents one or more additional fields that can contain data indicative of any other information that might be relevant to a currency value data record.

Figure 9:
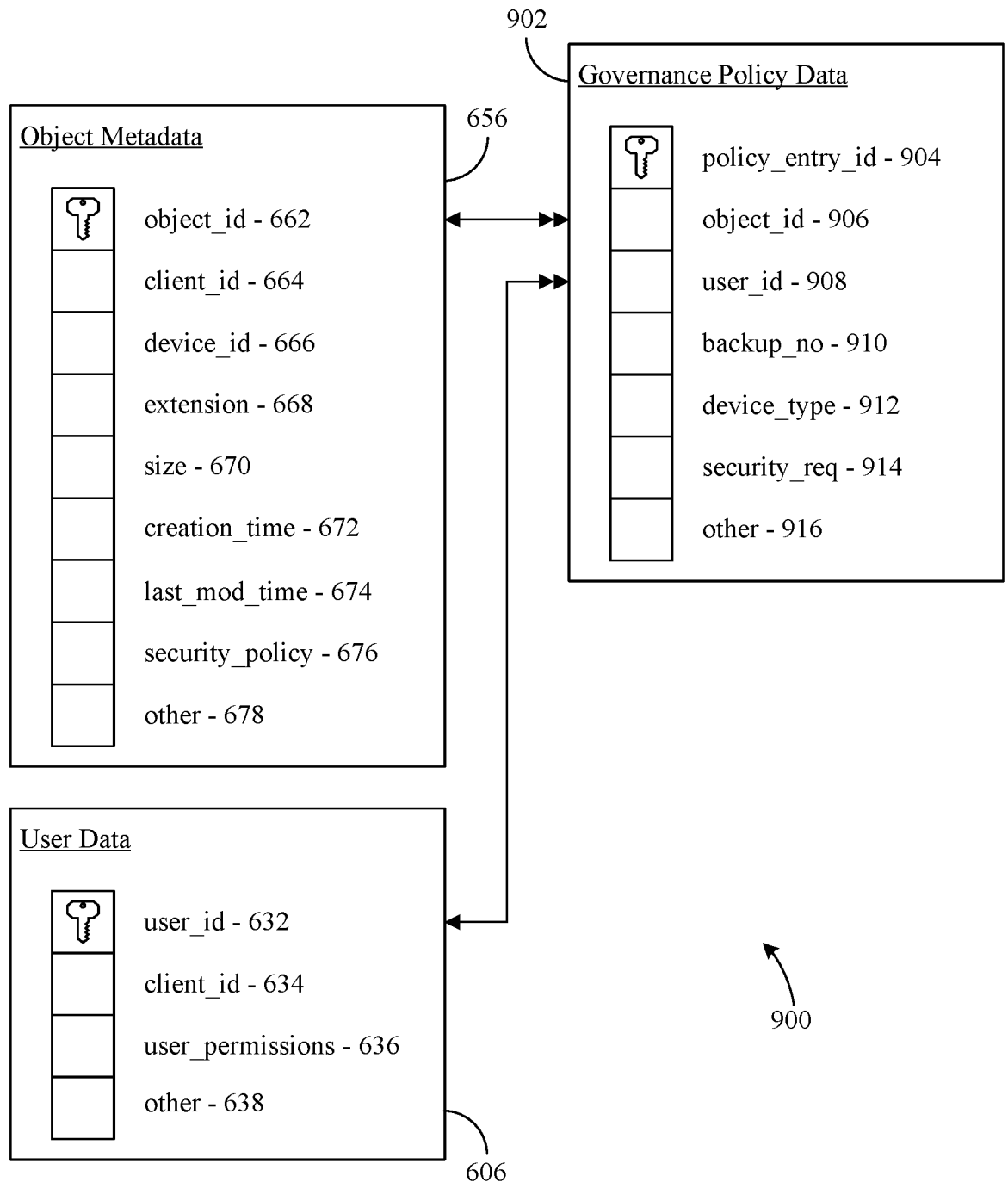
FIG. 9 is a diagram showing an example database schema 900 of a governance policy database of FIG. 4.

FIG. 9 shows a database schema 900, including user data table 606, object metadata table 656, and a governance policy data table 902. It should be noted that, although user data table 606 and object metadata table 656 are shown in more than one of raw data database 404, compound data database 406, file value database 408, and governance policy database 410 they are only saved once in governance database 206 (aside from any backup copies).

Governance policy data table 902 includes a policy_entry_id field 904, an object_id field 906, a user_id field 908, a backup_no field 910, a device_type field 912, a security_req field 914, and an other field 916. Policy/value reviser 308 utilizes data from databases 404, 406, and 408 to generate governance policy data table 902.

Policy_entry_id field 904 is the key field of governance policy data table 902 and an alphanumeric string, which uniquely identifies each record in governance policy data table 902. Object_id field 906 contains data that uniquely identifies a particular data object. Object_id field 906 and object_id field 662 of object metadata table 656 create a many-to-one relationship between records in governance policy data table 902 and object metadata table 656, because each governance policy record corresponds to only one object and each object corresponds to many governance policy records. User_id field 908 contains data that uniquely identifies a particular user. User_id field 908 and user_id field 632 of user data table 606 create a many-to-one relationship between records in governance policy data table 902 and user data table 606, because each governance policy record corresponds to only one user and each user corresponds to many governance policy records. Each record in governance policy data table 902 can include a null value in either of object_id field 906, user_id field 908, or neither. In the case of a null value in object_id field 906, the record corresponds to a particular user without reference to any particular data object. For example, a governance policy record corresponding to a particular user might dictate that the user only access objects having a particular value in one of value categories 522. In the case of a null value in user_id field 908, the record corresponds to a particular data object without reference to any particular user. For example, a governance policy record corresponding to a particular data object might dictate that the data object should be password protected. In the case of a null value in neither of object_id field 906 or user_id field 908, the record corresponds to a particular object with reference to a particular user. For example, a governance policy record corresponding to a particular user and a particular object might dictate that the user access the object from a particular device. Backup_no field 910 contains data indicating the number of times an object should be backed up. Device_type field 912 contains data that indicates what type of device an object should be stored on. Security_req field 914 contains data that indicates a particular security requirement relating to the object or the user. Other field 916 represents one or more additional fields that can contain data indicative of any other information that might be relevant to a governance policy record.

Figure 10:
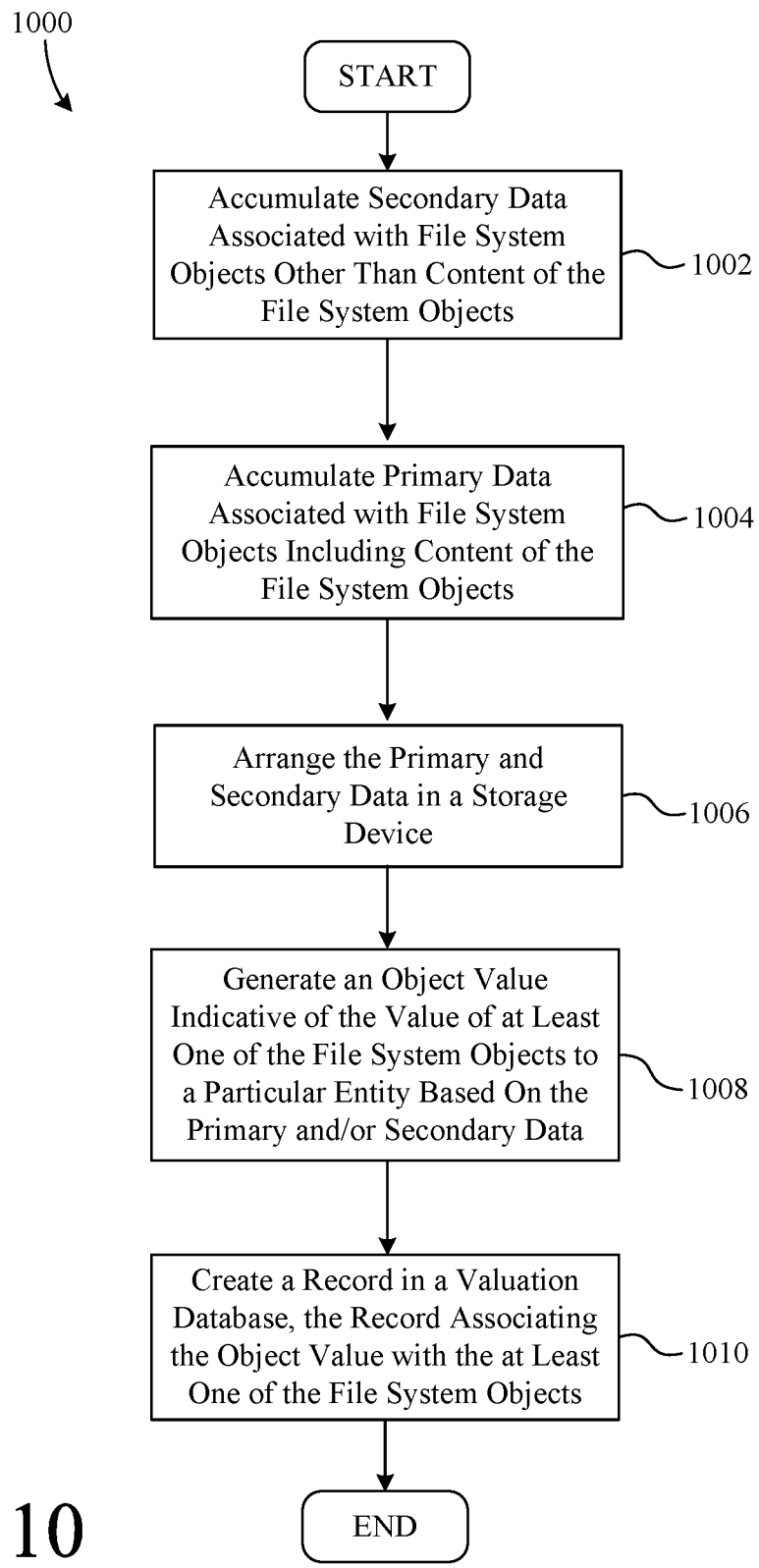
FIG. 10 is a flow chart summarizing an example method for generating object values corresponding to file system objects in a file storage system.

FIG. 10 is a flow chart summarizing an example method 1000 for generating object values corresponding to file system objects in a file storage system. In a first step 1002, secondary data associated with the file system objects is accumulated. The secondary data is data other than (i.e., does not include) content of the file system objects. Then, in a second step 1004, primary data, including file content, associated with the file system objects is accumulated. Then, in a third step 1006, the primary data and the secondary data are arranged in a storage device. Next, in a fourth step 1008, one or more object values indicative of the value(s) of at least one of the file system objects to a particular entity is generated. Finally, in a fifth step 1010, a record is created in a valuation database. The record associates the object value(s) with the at least one of the file system objects.

The description of particular embodiments of the present invention is now complete. Many of the described features may be substituted, altered or omitted without departing from the scope of the invention. For example, many, if not all, of the functions described with respect to the remote cloud can also be performed in the local cloud or the valuation service SaaS. As another example, particular data structures are shown to provide examples of data that might be used in the process of generating object values. These data structures are non-limiting examples and can be replaced/supplemented by any of a wide range of varying data structures now known, or yet to be developed, without departing from the scope of the invention. As yet another example, alternate storage and processing devices can be used to facilitate implementation of various aspects of the present invention, including, but not limited to, gate arrays, microprocessors, computer-readable media, and/or semiconductor and/or other optical storage devices. These and other deviations from the particular embodiments shown will be apparent to those skilled in the art, particularly in view of the foregoing disclosure.

We claim:

1. A method for storing file system objects in a file storage system, said method comprising:
   accumulating secondary data associated with said file system objects, said secondary data being other than content of said file system objects;
   arranging said secondary data in a storage device;
   generating an object value indicative of the value of at least one of said file system objects to a particular entity, said object value being expressed in the form of a monetary currency;
   creating a record in a valuation database, said record associating said object value with said at least one of said file system objects;
   accessing said record in said valuation database in order to determine said object value of said at least one of said file system objects; and
   storing said at least one of said file system objects in one of a plurality of storage devices based at least in part on said value of said at least one of said file system objects; and wherein
   each storage device of said plurality of storage devices includes a particular set of storage characteristics; and
   said step of storing said at least one of said file system objects includes storing said at least one of said file system objects in said one of said plurality of storage devices based at least in part on a first particular set of storage characteristics corresponding to said one of said plurality of storage devices.

2. The method of claim 1, wherein said step of generating an object value includes generating a plurality of object values, each object value indicative of a distinct value of said at least one of said file system objects from a different perspective.

3. The method of claim 2, wherein one of said plurality of object values is indicative of a value of said at least one of said file system objects from a data security perspective.

4. The method of claim 2, wherein one of said plurality of object values is indicative of a value of said at least one of said file system objects from a business continuity perspective.

5. The method of claim 1, wherein said secondary data includes data associated with said particular entity but not directly associated with any particular subset of said file system objects.

6. The method of claim 1, wherein said step of generating an object value includes:
   generating compound data based at least in part on said secondary data accumulated from different sources; and
   using said compound data to generate said object value.

7. The method of claim 6, wherein said compound data includes user activity data associated with said file system objects, said user activity data indicative of activity of users of said file storage system with respect to said file system objects.

8. The method of claim 1, further comprising:
   accumulating primary data indicative of content of said individual ones of said file system objects; and
   arranging said primary data in said storage device.

9. The method of claim 8, wherein said step of accumulating primary data includes scanning said individual ones of said file system objects to obtain said content from said individual ones of said file system objects.

10. The method of claim 8, wherein said step of accumulating primary data includes categorizing said individual ones of said file system objects based at least in part on said content of said individual ones of said file system objects.

11. The method of claim 8, further comprising utilizing at least a portion of said primary data and said secondary data to generate compound data, said compound data being indicative of relationships between individual ones of said file system objects.

12. The method of claim 11, wherein said step of utilizing at least a portion of said primary data and said secondary data to generate compound data includes estimating the similarity of two or more different ones of said file system objects, based at least in part on said primary data.

13. The method of claim 1, wherein said step of accumulating secondary data includes accessing metadata associated with said individual ones of said file system objects.

14. The method of claim 1, wherein said step of accumulating secondary data includes accumulating data indicative of an infrastructure of said file storage system.

15. The method of claim 1, further comprising expressing said object value of said at least one of said file system objects relative to object values of others of said file system objects.

16. The method of claim 15, wherein said step of expressing said object value of said at least one of said file system objects relative to object values of others of said file system objects includes expressing said object value relative to a base value that is equal to a lowest object value of said object values of said others of said file system objects.

17. The method of claim 1, further comprising utilizing said object value of said at least one of said file system objects to inform IT policy changes relating to said particular entity.

18. The method of claim 1, wherein said step of accumulating secondary data includes accessing said file system objects of said file storage system over a wide area network.

19. A system for performing valuations of file system objects and storing said file system objects, said valuation system comprising:
- a processor configured to execute code, said code including a set of predefined instructions configured to cause said processor to perform a corresponding set of operations when executed by said processor;
- memory configured to store data and said code, said code including
  - an accumulator including a first subset of said set of predefined instructions configured to accumulate secondary data associated with said file system objects, said secondary data being non-object-content data,
  - a data aggregator including a second subset of said set of predefined instructions configured to arrange said secondary data in said memory,
  - a value generator including a third subset of said set of predefined instructions configured to generate an object value indicative of the value of at least one of said file system objects to a particular entity, said object value being expressed in the form of a monetary currency, and to create a record in a valuation database to associate said object value with said at least one of said file system objects, and
  - a storage manager including a fourth subset of said set of predefined instructions configured to access said record in said valuation database in order to determine said object value of said at least one of said file system objects and store said at least one of said file system objects in one of a plurality of storage devices based at least in part on said value of said at least one of said file system objects; and wherein
- each storage device of said plurality of storage devices includes a particular set of storage characteristics; and
- said at least one of said file system objects is stored in said one of said plurality of storage devices based at least in part on a first particular set of storage characteristics corresponding to said one of said plurality of storage devices.

20. The system of claim 19, wherein said value generator is configured to generate a plurality of object values, each object value indicative of a distinct value associated with said at least one of said file system objects from a different perspective.

21. The system of claim 20, wherein one of said plurality of object values is indicative of a value of said at least one of said file system objects from a data security perspective.

22. The system of claim 20, wherein one of said plurality of object values is indicative of a value of said at least one of said file system objects from a business continuity perspective.

23. The system of claim 19, wherein said secondary data includes data associated with said particular entity but not directly associated with any particular subset of said file system objects.

24. The system of claim 19, wherein said value generator is configured to:
- generate compound data based at least in part on said secondary data accumulated from different sources; and
- utilize said compound data to generate said object value.

25. The system of claim 24, wherein said compound data includes user activity data associated with said file system objects, said user activity data being indicative of activity of users of said file storage system with respect to said file system objects.

26. The system of claim 19, wherein:
- said accumulator is configured to accumulate primary data indicative of content of said individual ones of said file system objects; and
- said data aggregator is configured to arrange said primary data in said storage device.

27. The system of claim 26, wherein said accumulator is additionally configured to scan said individual ones of said file system objects to obtain said content from said individual ones of said file system objects.

28. The system of claim 26, wherein said accumulator is additionally configured to categorize said individual ones of said file system objects based at least in part on said content of said individual ones of said file system objects.

29. The system of claim 26, wherein said value generator is configured to utilize at least a portion of said primary data and said secondary data to generate compound data, said compound data being indicative of relationships between individual ones of said file system objects.

30. The system of claim 29, wherein said value generator is additionally configured to estimate the similarity of two or more different ones of said file system objects, based at least in part on said primary data.

31. The system of claim 19, wherein said accumulator is configured to access metadata associated with said individual ones of said file system objects.

32. The system of claim 19, wherein said accumulator is configured to accumulate data indicative of an infrastructure of said file storage system.

33. The system of claim 19, wherein said value generator is configured to express said object value of said at least one of said file system objects relative to object values of others of said file system objects.

34. The system of claim 33, wherein said value generator is additionally configured to express said object value relative to a base value that is equal to a lowest object value of said object values of said others of said file system objects.

35. The system of claim 19, further comprising a valuation enforcer including a fifth subset of said set of predefined instructions configured to utilize said object value of said at least one of said file system objects to inform IT policy changes relating to said particular entity.

36. The system of claim 19, further comprising a network adapter configured to access said file system objects of said file storage system over a wide area network.

37. A valuation system for performing valuations of file system objects, said valuation system comprising:
- an accumulator configured to accumulate secondary data associated with said file system objects, said secondary data being non-object-content data;
- a data aggregator configured to arrange said secondary data in a storage device;

means for generating an object value indicative of the value of at least one of said file system objects to a particular entity, and associating said object value with said at least one of said file system objects; and means for accessing said record in said valuation database in order to determine said object value of said at least one of said file system objects and storing said at least one of said file system objects in one of a plurality of storage devices based at least in part on said value of said at least one of said file system objects; and wherein each storage device of said plurality of storage devices includes a particular set of storage characteristics; and said at least one of said file system objects is stored in said one of said plurality of storage devices based at least in part on a first particular set of storage characteristics corresponding to said one of said plurality of storage devices.

* * * * *